United States Patent
McNutt et al.

(10) Patent No.: US 7,229,354 B2
(45) Date of Patent: Jun. 12, 2007

(54) INTERACTIVE WAGERING SYSTEMS AND METHODS FOR RESTRICTING WAGERING ACCESS

(75) Inventors: Richard E. McNutt, Lafayette, CO (US); Connie T. Marshall, Muskogee, OK (US); Masood Garahi, Superior, CO (US); Douglas V. Ramsey, Louisville, CO (US)

(73) Assignee: ODS Properties, Inc., Los Angeles, CA (US)

( * ) Notice: Subject to any disclaimer, the term of this patent is extended or adjusted under 35 U.S.C. 154(b) by 420 days.

(21) Appl. No.: 09/827,679

(22) Filed: Apr. 5, 2001

(65) Prior Publication Data

US 2001/0037211 A1 Nov. 1, 2001

Related U.S. Application Data

(60) Provisional application No. 60/198,399, filed on Apr. 19, 2000, provisional application No. 60/194,855, filed on Apr. 5, 2000.

(51) Int. Cl.
*A63F 9/24* (2006.01)
(52) U.S. Cl. .............................. 463/29; 463/25; 463/42; 705/67; 902/23
(58) Field of Classification Search .................... 463/1, 463/25, 29, 40–42; 709/227; 713/200–204; 705/64–67; 379/93.12, 93.13; 902/23
See application file for complete search history.

(56) References Cited

U.S. PATENT DOCUMENTS

| | | | |
|---|---|---|---|
| 3,909,002 A | 9/1975 | Levy | 273/138 A |
| 4,033,588 A | 7/1977 | Watts | 273/138 A |
| 4,108,361 A | 8/1978 | Krause | 235/375 |
| 4,322,612 A | 3/1982 | Lange | 235/419 |
| 4,339,798 A | 7/1982 | Hedges et al. | 364/412 |

(Continued)

FOREIGN PATENT DOCUMENTS

EP 0 387 046 A2 9/1990

(Continued)

OTHER PUBLICATIONS

Leiden, Candace et al., TCP/IP for Dummies, 1997, second edition, p. 331.*
US 5,823,877, 10/1998, Scagnelli et al. (withdrawn)

*Primary Examiner*—Scott Jones
(74) *Attorney, Agent, or Firm*—Fish & Neave IP Group Ropes & Gray LLP

(57) ABSTRACT

Systems and methods are provided for an interactive wagering application that restricts wagering access. The restrictions may be based on user-defined restrictions on the location of the user equipment or any other suitable criterion. The interactive wagering application may compare blackout information and user equipment location information. When blackout information and location information match, wagering access may be restricted. An interactive wagering system may verify that the user equipment is in a location where wagering is permitted. If verified, the user equipment may be granted a location verification token. The location verification token may indicate to the interactive wagering application that the user may be provided with wagering access. User-defined wagering restrictions may also be used to restrict wagering access.

79 Claims, 18 Drawing Sheets

U.S. PATENT DOCUMENTS

| | | | |
|---|---|---|---|
| 4,372,558 A | 2/1983 | Shimamoto et al. | 273/238 |
| 4,494,197 A | 1/1985 | Troy et al. | 364/412 |
| 4,593,904 A | 6/1986 | Graves | 273/1 E |
| 4,636,951 A | 1/1987 | Harlick | 364/412 |
| 4,652,998 A | 3/1987 | Koza et al. | 364/412 |
| 4,689,742 A | 8/1987 | Troy et al. | 364/412 |
| 4,694,490 A | 9/1987 | Harvey et al. | 380/234 |
| 4,745,468 A | 5/1988 | Von Kohorn | 358/84 |
| 4,747,600 A | 5/1988 | Richardson | 273/269 |
| 4,760,527 A | 7/1988 | Sidley | 364/412 |
| 4,764,666 A | 8/1988 | Bergeron | 235/380 |
| 4,815,741 A | 3/1989 | Small | 273/138 A |
| 4,882,473 A | 11/1989 | Bergeron et al. | 235/380 |
| 4,922,522 A | 5/1990 | Scanlon | 379/95 |
| 4,926,255 A | 5/1990 | Von Kohorn | 358/84 |
| 4,926,327 A | 5/1990 | Sidley | 364/412 |
| 4,965,825 A | 10/1990 | Harvey et al. | 380/233 |
| 4,969,183 A | 11/1990 | Reese | 379/88 |
| 4,996,705 A | 2/1991 | Entenmann et al. | 379/91 |
| 5,003,595 A * | 3/1991 | Collins et al. | 707/9 |
| 5,007,649 A | 4/1991 | Richardson | 273/237 |
| 5,034,807 A | 7/1991 | Von Kohorn | 358/84 |
| 5,054,787 A | 10/1991 | Richardson | 273/369 |
| 5,057,915 A | 10/1991 | Von Kohorn | 358/84 |
| 5,083,272 A * | 1/1992 | Walker et al. | 463/25 |
| 5,096,195 A | 3/1992 | Gimmon | 273/138 |
| 5,096,202 A | 3/1992 | Hesland | 273/237 |
| 5,112,050 A | 5/1992 | Koza et al. | 273/139 |
| 5,119,295 A | 6/1992 | Kapur | 364/412 |
| 5,178,389 A | 1/1993 | Bentley et al. | 273/138 |
| 5,186,471 A | 2/1993 | Vancraeynest | 273/439 |
| 5,218,631 A | 6/1993 | Katz | 463/41 |
| 5,276,312 A | 1/1994 | McCarthy | 235/380 |
| 5,280,426 A | 1/1994 | Edmonds | 364/408 |
| 5,282,620 A | 2/1994 | Keesee | 273/138 |
| 5,283,734 A | 2/1994 | Von Kohorn | 364/412 |
| 5,286,023 A | 2/1994 | Wood | 273/138 |
| 5,297,802 A | 3/1994 | Pocock et al. | 273/439 |
| 5,326,104 A | 7/1994 | Pease et al. | 273/138 A |
| 5,327,485 A | 7/1994 | Leaden | 379/95 |
| 5,333,868 A | 8/1994 | Goldfarb | 273/138 A |
| 5,340,119 A | 8/1994 | Goldfarb | 273/439 |
| 5,351,970 A | 10/1994 | Fioretti | 273/439 |
| 5,354,069 A | 10/1994 | Guttman et al. | 273/439 |
| 5,365,575 A | 11/1994 | Katz | 379/92 |
| 5,398,932 A | 3/1995 | Eberhardt et al. | 273/138 |
| 5,403,999 A | 4/1995 | Entenmann et al. | 235/379 |
| 5,417,424 A | 5/1995 | Snowden et al. | 273/138 |
| 5,505,449 A | 4/1996 | Eberhardt et al. | 273/138 |
| 5,507,489 A | 4/1996 | Reibel et al. | 273/138 |
| 5,518,253 A | 5/1996 | Pocock et al. | 273/439 |
| 5,539,450 A | 7/1996 | Handelman | 348/12 |
| 5,539,822 A | 7/1996 | Lett | 380/20 |
| 5,545,088 A | 8/1996 | Kravitz et al. | 463/40 |
| 5,569,083 A | 10/1996 | Fioretti | 463/19 |
| 5,573,244 A | 11/1996 | Mindes | 463/26 |
| 5,575,474 A | 11/1996 | Rossides | 463/26 |
| 5,577,727 A | 11/1996 | Brame et al. | 273/139 |
| 5,586,937 A | 12/1996 | Menashe | 463/41 |
| 5,608,785 A | 3/1997 | Kasday | 379/90 |
| 5,618,232 A * | 4/1997 | Martin | 463/25 |
| 5,643,088 A | 7/1997 | Vaughn et al. | 463/40 |
| 5,647,795 A | 7/1997 | Stanton | 463/1 |
| 5,672,106 A * | 9/1997 | Orford et al. | 463/28 |
| 5,679,077 A | 10/1997 | Pocock et al. | 463/19 |
| 5,683,090 A | 11/1997 | Zeile et al. | 273/269 |
| 5,688,174 A | 11/1997 | Kennedy | 463/37 |
| 5,713,795 A | 2/1998 | Kohorn | 463/17 |
| 5,722,890 A | 3/1998 | Libby et al. | 463/17 |
| 5,729,212 A | 3/1998 | Martin | 340/870.28 |
| 5,746,657 A | 5/1998 | Ueno | 463/41 |
| 5,749,785 A | 5/1998 | Rossides | 463/25 |
| 5,755,621 A | 5/1998 | Marks et al. | 463/42 |
| 5,759,101 A | 6/1998 | Von Kohorn | 463/40 |
| 5,762,552 A | 6/1998 | Vuong et al. | 463/25 |
| 5,772,511 A | 6/1998 | Smeltzer | 463/17 |
| 5,774,670 A * | 6/1998 | Montulli | 709/227 |
| 5,787,156 A | 7/1998 | Katz | 379/93.13 |
| 5,800,268 A | 9/1998 | Molnick | 463/40 |
| 5,816,917 A | 10/1998 | Kelmer et al. | 463/16 |
| 5,816,919 A | 10/1998 | Scagnelli et al. | 463/25 |
| 5,823,879 A | 10/1998 | Goldberg et al. | 463/42 |
| 5,830,067 A | 11/1998 | Graves et al. | 463/40 |
| 5,830,069 A * | 11/1998 | Soltesz et al. | 463/42 |
| 5,871,398 A | 2/1999 | Schneier et al. | 463/16 |
| 5,910,047 A | 6/1999 | Scagnelli et al. | 463/17 |
| 5,921,865 A * | 7/1999 | Scagnelli et al. | 463/17 |
| 5,954,582 A | 9/1999 | Zach | 463/25 |
| 5,999,808 A | 12/1999 | LaDue | 455/412 |
| 6,001,016 A | 12/1999 | Walker et al. | 463/742 |
| 6,007,426 A | 12/1999 | Kelly et al. | 463/16 |
| 6,024,640 A | 2/2000 | Walker et al. | 463/17 |
| 6,024,641 A | 2/2000 | Sarno | 463/17 |
| 6,030,288 A | 2/2000 | Davis et al. | 463/29 |
| 6,080,062 A | 6/2000 | Olson | 463/42 |
| 6,080,063 A | 6/2000 | Khosla | 463/42 |
| 6,085,224 A * | 7/2000 | Wagner | 709/203 |
| 6,099,408 A | 8/2000 | Schneier et al. | 463/29 |
| 6,102,797 A | 8/2000 | Kail | 463/16 |
| 6,104,815 A * | 8/2000 | Alcorn et al. | 380/251 |
| 6,117,011 A | 9/2000 | Lvov | 463/25 |
| 6,117,013 A | 9/2000 | Eiba | 463/41 |
| 6,147,642 A | 11/2000 | Perry et al. | 342/357.15 |
| 6,151,626 A * | 11/2000 | Tims et al. | 725/25 |
| 6,152,824 A | 11/2000 | Rothschild et al. | 463/42 |
| 6,186,892 B1 | 2/2001 | Frank et al. | 463/19 |
| 6,203,427 B1 | 3/2001 | Walker et al. | 463/16 |
| 6,251,016 B1 | 6/2001 | Tsuda et al. | 463/42 |
| 6,251,017 B1 | 6/2001 | Leason et al. | 463/42 |
| 6,252,547 B1 | 6/2001 | Perry et al. | 342/367 |
| 6,254,480 B1 | 7/2001 | Zach | 463/17 |
| 6,257,982 B1 | 7/2001 | Rider et al. | 463/31 |
| 6,263,054 B1 | 7/2001 | Haefliger | 379/93.13 |
| 6,264,560 B1 | 7/2001 | Goldberg et al. | 463/42 |
| 6,272,223 B1 | 8/2001 | Carlson | 380/251 |
| 6,273,820 B1 | 8/2001 | Haste, III | 463/40 |
| 6,508,710 B1 * | 1/2003 | Paravia et al. | 463/42 |
| 2001/0003099 A1 | 6/2001 | Von Kohorn | 463/40 |
| 2001/0003100 A1 | 6/2001 | Yacenda | 463/41 |
| 2002/0161670 A1 * | 10/2002 | Walker et al. | 705/26 |

FOREIGN PATENT DOCUMENTS

| | | |
|---|---|---|
| EP | 0 583 196 A1 | 2/1994 |
| EP | 0 673 004 A2 | 9/1995 |
| EP | 0 673 004 A3 | 9/1995 |
| EP | 0 873 772 A1 | 10/1998 |
| EP | 0 934 765 A1 | 8/1999 |
| JP | 01-25659 | 1/1989 |
| JP | 01-269157 | 10/1989 |
| JP | 02-110660 | 4/1990 |
| JP | 02-231671 | 9/1990 |
| JP | 06-325062 | 11/1994 |
| WO | WO 95/30944 | 11/1995 |
| WO | WO 97/19428 | 5/1997 |
| WO | WO 200058858 A1 * | 10/2000 |
| WO | WO 01/57817 | 8/2001 |
| WO | WO 01/65509 | 9/2001 |

* cited by examiner

INTERACTIVE WAGERING SYSTEMS AND METHODS FOR RESTRICTING WAGERING ACCESS

This application claims the benefit of U.S. provisional application No. 60/194,855, filed Apr. 5, 2000, and U.S. provisional application No. 60/198,399, filed Apr. 19, 2000, both of which are hereby incorporated by reference herein in their entireties.

BACKGROUND OF THE INVENTION

This invention relates to an interactive wagering application, and more particularly, to an interactive wagering application that may restrict wagering access.

Wagering is a popular leisure activity. For example, many racing fans wager on events such as horse racing, dog racing, and harness racing. However, it may be inconvenient to attend racing events in person. Not all racing fans have sufficient time to visit racetracks as often as they would like and some fans have difficulties in obtaining suitable transportation to the track. Off-track betting establishments are available for fans who cannot attend racing events in person, but fans must still travel to the off-track betting establishments.

As a result, interactive wagering platforms, such as systems for wagering using a television set-top box, have become available. Such wagering platforms are frequently implemented using set-top boxes that communicate with a cable head end. In such implementations, the cable systems usually take into account local rules governing the availability of set-top box wagering. However, when implemented in a satellite wagering television system, such as a digital broadcast satellite (DBS) system, there may be no wagering access restriction because the same interface is integrated in all integrated receiver decoders (IRDs) that receive the system's signal, regardless of location. Similarly, when the wagering platform is implemented on a personal computer, the wagering platform may present the user with wagering access in geographic locations where wagering may be prohibited. In some cases, the user may transport, move, or relocate the wagering platform to a location where wagering is prohibited and unknowingly be provided with illegal wagering access. Such access to wagering may be confusing, offensive, or criminal to viewers in these locations.

It is therefore an object of the present invention to provide an interactive wagering application that restricts wagering access based on particular criteria.

SUMMARY OF THE INVENTION

This and other objects are accomplished in accordance with the principles of the present invention by providing an interactive wagering application that may restrict wagering access based on particular criteria. For example, the criteria may include the location of the user equipment, user-defined wagering restrictions, or any other suitable criteria.

If the wagering platform is based on a satellite system, such as a digital broadcast satellite (DBS) system, an interactive wagering application may determine user equipment location by, for example, analyzing blackout information together with user equipment location information. Blackout information may include information such as locations in which wagering is restricted. When the blackout information identifies a restricted location that corresponds to the user equipment location, the interactive wagering application may restrict wagering access. Alternatively, blackout information may identify locations in which wagering is not restricted.

In another suitable approach, the interactive wagering system may determine the location of the user equipment by accessing a telephone network, a relevant Internet service provider (ISP), or any other suitable system or service to obtain location information associated with the user equipment. The interactive wagering system may provide the user equipment with a location verification token to verify that the user equipment is located in a location that allows wagering. When the user attempts to place a wager using the user equipment, the interactive wagering application may search for the location verification token before providing the user with wagering access. If the location verification token is found, access may be granted. If the location verification token is not found, an appropriate message may be displayed.

The interactive wagering application may restrict wagering access based on user-defined wagering restrictions. For example, the user may be provided with the ability to set restrictions that may limit or prevent wagering access. The user may set one or more passwords to access particular wagering services. The user may be provided with the ability to specify a time block in which to block wagering access.

In another suitable approach, the interactive wagering application may restrict wagering access by removing wagering options from on-screen menus, by displaying wagering options using an inactive mode and appearance (e.g., shaded and not selectable), by suppressing on-screen icons related to wagering, by displaying appropriate messages when the user attempts to access wagering-related features, or by using any other suitable technique that may restrict wagering access. In another suitable approach, the interactive wagering application may suppress broadcast of wagering events from being displayed on the user equipment.

Further features of the invention, its nature and various advantages will be more apparent from the accompanying drawings and from the following detailed description of the preferred embodiments.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
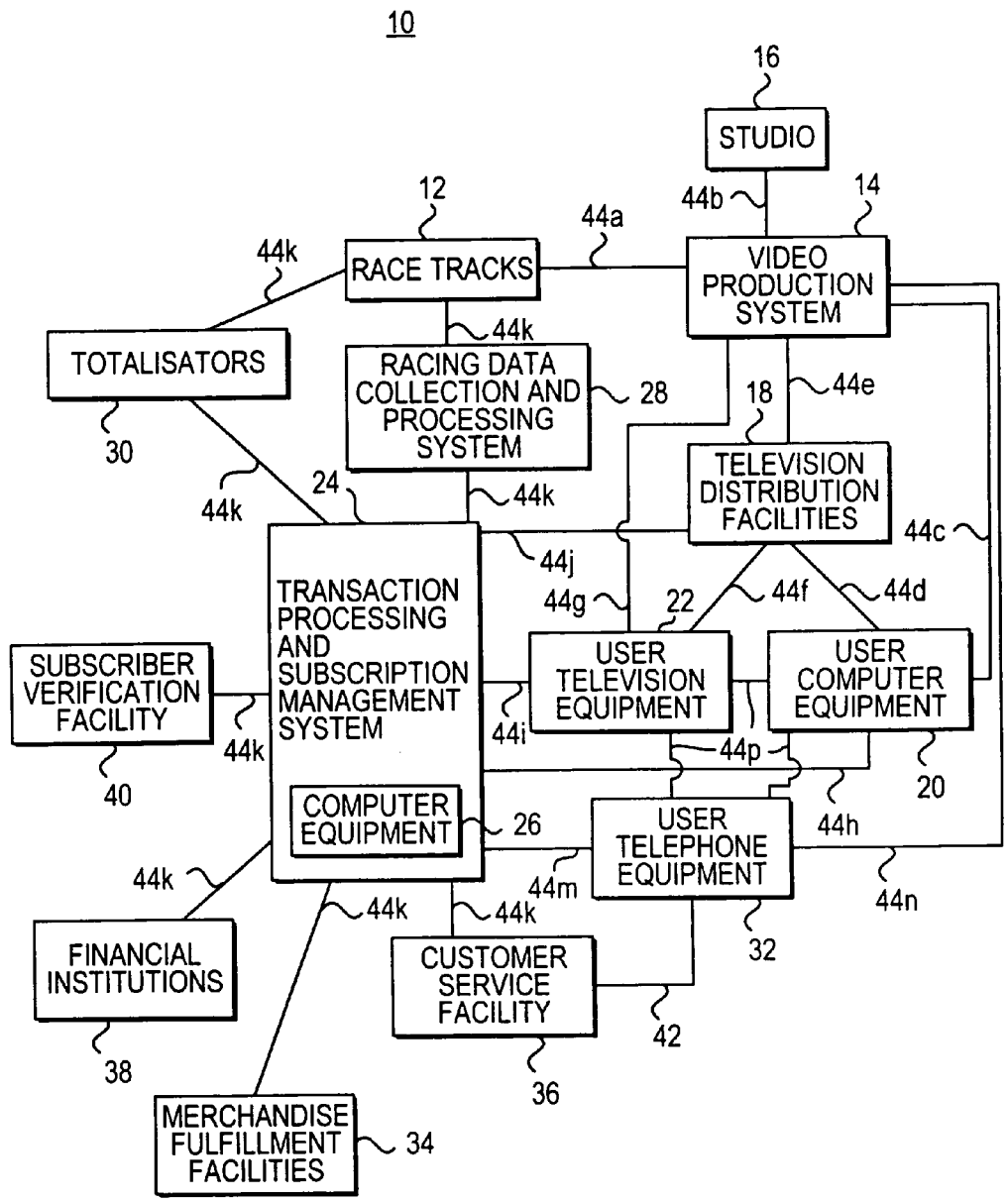
FIG. 1 is a schematic diagram of an illustrative interactive wagering system in accordance with one embodiment of the present invention.

An illustrative interactive wagering system 10 in accordance with the present invention is shown in FIG. 1. Aspects of the invention apply to various different types of wagering, but are described herein primarily in the context of interactive wagering on races (e.g., horse races) for specificity and clarity.

Races may be run at racetracks 12, which may be located at various geographic locations. Races run at the racetracks may be simulcast to television viewers. For example, simulcast videos may be provided to users with satellite receivers or to off-track betting establishments via satellite.

Interactive wagering system 10 may be used to provide an interactive wagering service to users of various user equipment. An interactive wagering application may be used to provide the wagering service. The interactive wagering application may run locally on the user equipment. User equipment may include a set-top box, a personal computer, a cellular telephone, a handheld computing device, or any other suitable device. In another suitable approach, the interactive wagering application may run using a client-server or distributed architecture where a portion of the application may be implemented locally on the user equipment in the form of a client process. Another portion of the interactive wagering application may be implemented at a remote location, such as on a server or other such equipment, as a server process. These arrangements are merely illustrative. Other suitable techniques for implementing the interactive wagering application may be used.

Real-time videos from racetracks 12 may also be provided to video production system 14 for distribution to users as part of a television wagering service. For example, the videos may be provided via a wagering-related television channel or Internet-delivered service or any other suitable technique. In one suitable approach, multiple simulcast videos may be provided to video production system 14 in real-time. Talent (e.g., commentators) for the television wagering service provided by the interactive wagering application may be located at studio 16. Studio 16 may provide a video feed containing commentary and the like to video production system 14. Graphic overlays for the television wagering service may be added to the service at video production system 14.

The interactive television wagering service may use video production system 14 to combine selected video segments from desired racing simulcasts with the video feed from studio 16 and suitable graphic overlays. In one suitable approach, video production system 14 or a separate facility may be used to reformat simulcasts from racetracks 12. For example, if racetracks 12 provide simulcasts as traditional analog television channels, video production system 14 (or a separate facility) may convert these simulcasts or portions of these simulcasts into digital signals (e.g., digital video signals) or into a different number of analog signals. Digital video signals may require less bandwidth than analog video signals and may be appropriate for situations in which videos are to be transmitted over either high or low bandwidth pathways. Low bandwidth pathways may include telephone lines, the Internet, or any other suitable pathway.

Video production system 14 may be used to provide a television wagering service that includes selected simulcast videos, video from studio 16, and graphic overlays to television distribution facilities 18 (for redistribution to user television equipment 22 and user computer equipment 20), to user computer equipment 20, and to user telephone equipment 32 (if user telephone equipment 32 has a display capable of displaying moving images). Television distribution facilities 18 may be any suitable facilities for supplying television to users, such as cable system headends, satellite systems, wireless systems, broadcast television systems, or other suitable systems or combinations of such systems. User computer equipment 20 may be any suitable computer equipment that supports an interactive wagering application. For example, user computer equipment 20 may be a personal computer. User computer equipment 20 may also be based on a mainframe computer, a workstation, a networked computer or computers, a laptop computer, a notebook computer, an electronic book, a handheld computing device such as a personal digital assistant or other small portable computer, etc.

Each of television distribution facilities 18 is typically located at a different geographic location. Users with user television equipment 22 may receive the television wagering service from an associated television distribution facility. User television equipment 22 may include, for example, a television or other suitable monitor. A television may be used to watch the television wagering service on a traditional analog television channel. User television equipment 22 may also include a digital or analog set-top box connected to a television distribution facility by a cable path. A digital set-top box may be used to receive the television wagering service on a digital channel. In one suitable approach, user television equipment 22 may contain a satellite receiver, a wireless receiver, a WebTV box, a personal computer television (PC/TV), or hardware similar to such devices into which set-top box capabilities have been integrated. A recording device such as a videocassette recorder or digital recording device (e.g., a personal video recorder (PVR) or digital video recorder (DVR) based on hard disk drives or the like) may be used in user television equipment 22 to store videos. The recording device may be separate from or part of the other components of user television equipment 22. A location device such as a global positioning satellite (GPS) receiver, a homing signal receiver, a wireless triangulation receiver, or any other suitable location information receiver may be used to provide information about the location of user television equipment 22.

Figure 2:
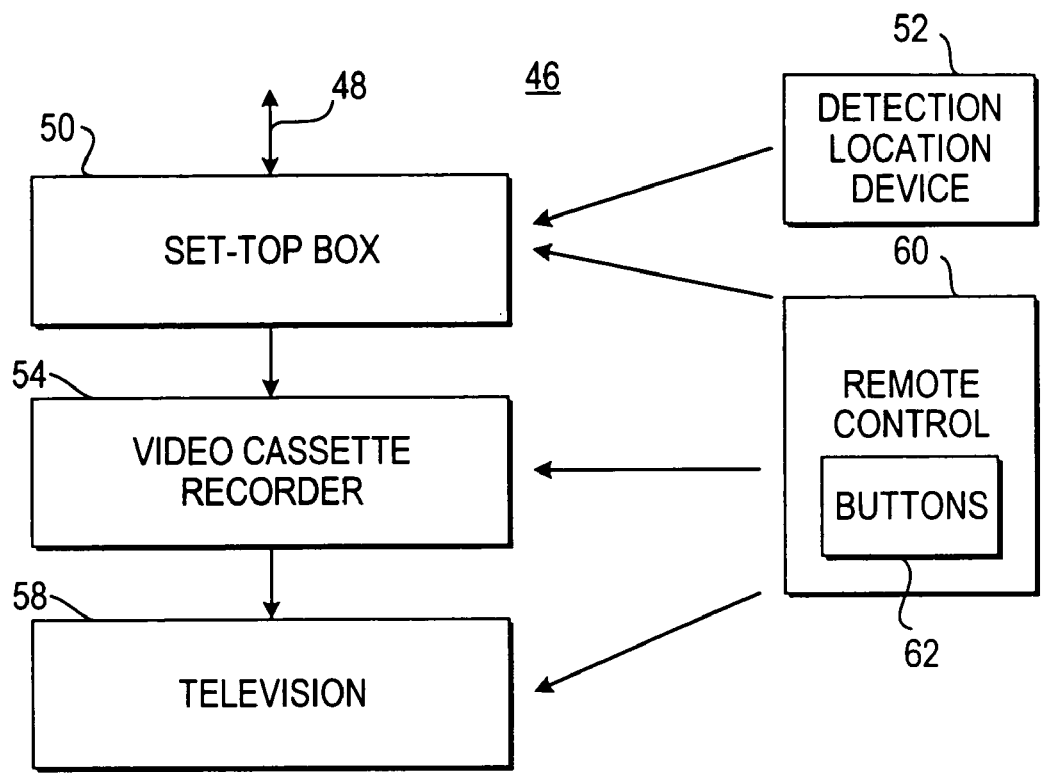
FIG. 2 is a schematic diagram of illustrative user television equipment in accordance with one embodiment of the present invention.

Illustrative user television equipment 46 is shown in FIG. 2. Set-top box 50 may receive television programming and data at line or input 48. Set-top box 50 may have analog and digital television tuning circuitry for handling analog and digital television signals. Television signals may be passed to videocassette recorder 54, which is separate from the hardware (i.e., set-top box 50) that implements the television wagering application, for recording. Set-top box 50 may also control the operation of videocassette recorder 54. For example, set-top box 50 may issue infrared commands that are received by videocassette recorder 54 at the same inputs at which standard remote control commands are received.

Videocassette recorder 54 may be connected to television 58. Television programming and graphic display screens generated by applications implemented using set-top box 50 may be passed from set-top box 50 to television 58 through videocassette recorder 54.

Set-top box 50 has memory and processing circuitry. This allows set-top box 50 to be used to implement applications that support an interactive wagering application, television wagering service, interactive television program guide, web browsing and Internet access, and other services such as home shopping, home banking, and video-on-demand services, etc.

In one suitable approach, set-top box 50 may have an integrated receiver decoder (IRD) for receiving television programming via satellite. If set-top box 50 has an IRD, the IRD may receive and decode the programming and data provided by interactive wagering system 10. In one suitable approach, the IRD may decode blackout information. Blackout information may be provided by entities who have rights to broadcast in a particular region. For example, if ESPN owns broadcasting rights to a sporting event taking place in New York City, ESPN may elect to blackout New York City (i.e., prevent the distribution of the local sporting event to residents in the city). Blackout information may include information that identifies locations in which wagering is restricted. For example, blackout information may include zip codes, cities, municipalities, counties, regions, states, countries, or any other suitable location identification information. In one suitable approach, blackout information may include an Internet protocol (IP) address or any other suitable network-based address.

Location information may be provided to set-top box 50 via, for example, location detection device 52. Location detection device 52 may include, for example, a global positioning satellite receiver, a communications device such as a modem, or any other suitable hardware capable of providing a location. For example, location information may include zip codes, cities, municipalities, counties, regions, states, countries, or any other suitable location identification information. In one suitable approach, location information may include an Internet protocol (IP) address or any other suitable network-based address.

A remote control 60 such as an infrared remote control may be used to control set-top box 50, videocassette recorder 54, and television 58. Remote control 60 may have buttons 62 such as a power button, right, left, up, and down arrow keys, an OK or select key, a favorites or fav key, a lock or parental control key, etc.

Referring back to FIG. 1, user computer equipment 20 may receive the television wagering service using a video card or other video-capable equipment to receive analog or digital (e.g., moving picture experts group or MPEG) videos from a television distribution facility. User computer equipment 20 may also receive the television wagering service directly from video production system 14 using, for example, a modem link. If desired, the video for the television wagering service may be compressed (e.g., using MPEG techniques). This may be useful, for example, if the path to user computer equipment 20 is a modem connection using telephone links, cable links, direct serial links (DSL), or any other suitable links. If video production system 14 is only used to serve user computer equipment 20 without traditional analog television capabilities, video production system 14 may only need to supply such digitally-compressed video signals and not analog television signals.

Figure 3:
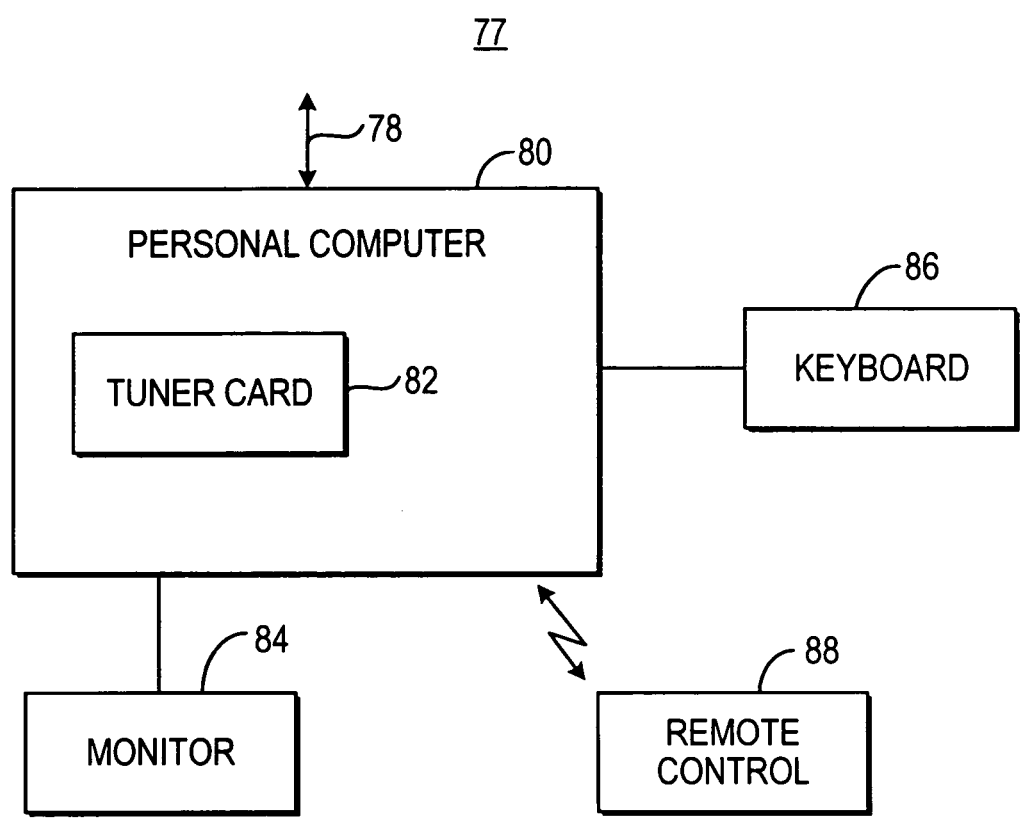
FIG. 3 is a schematic diagram of illustrative user computer equipment in accordance with one embodiment of the present invention.

Illustrative user computer equipment 77 is shown in FIG. 3. User computer equipment 77 may be based on a personal computer 80 or any other suitable computing device. Personal computer 80 may receive television programing and data for interactive services using line or input 78. Personal computer 80 may contain a tuner card 82 or other suitable circuitry for handling analog and digital television signals. Personal computer 80 may also contain memory and processing circuitry that allows personal computer 80 to be used to implement applications that support an interactive wagering application, television wagering service, interactive television program guide, web browsing and Internet access, and other services such as home shopping, home banking, video-on-demand services, etc. Personal computer 80 may contain a storage device such as a hard disk drive to store videos. Television signals and screens generated by interactive applications may be displayed on monitor 84.

The user may interact with personal computer 80 using any suitable user input interface, such as keyboard 86, a pointing device such as a trackball, mouse, or touch pad, a voice recognition system, a handwriting recognition system, etc. If desired, the user may interact with personal computer 80 using a wireless remote control such as remote control 88. Remote control 88 may be, for example, an infrared remote control.

Referring back to FIG. 1, video clips of races and other simulcast information may be provided to users in the form of a television wagering service or by an interactive wagering service provided by the interactive wagering application. If desired, race-related videos may be provided to the user by using video production system 14 or other suitable equipment to route appropriate video clips from the simulcasts to the user in real time. Video clips may also be stored for later viewing. For example, one or more video servers located at racetracks 12, video production system 14, television distribution facilities 18, or other suitable locations may be used to store video clips. The stored videos may then be played back in real time or downloaded for viewing at user television equipment 22, user computer equipment 20, or user telephone equipment 32. The video clips may contain videos of races, commentary, interviews with jockeys, or any other suitable race-related information. If desired, real-time or stored videos may be provided from racetracks 12 directly to user television equipment 22, user computer equipment 20, or user telephone equipment 32 over the Internet or other suitable communications paths without involving video production system 14. Videos may also be provided by routing video signals through equipment located elsewhere in system 10. For example, videos may be routed through transaction processing and subscription management system 24.

Transaction processing and subscription management system 24 may contain computer equipment 26 and other equipment for supporting system functions such as transaction processing (e.g., handling tasks related to wagers, product purchasing, adjusting the amount of funds in user accounts based on the outcomes of wagers, video clip ordering, etc.), data distribution (e.g., for distributing racing data to the users), and subscriber management (e.g., features related to opening an account for a user, closing an account, allowing a user to add or withdraw funds from an account, changing the user's address or personal identification number, etc.). Databases within transaction processing and subscription management system 24 or associated with system 24 may be used to store racing data, wagering data and other transaction data, and subscriber data such as information on the user's current account balance, past wagering history, individual wager limits, personal identification number, billing addresses, credit card numbers, bank account numbers, social security numbers, or any other personal user information. In one suitable approach, the databases may be used to store location information. The location information may include information related to the identification of locations where wagering, or particular types of wagering are illegal or otherwise not allowed. In another suitable approach, the location information may include information related to the identification of locations where wagering or particular types of wagering are legal and allowed. Using such databases may allow the user to access information more quickly and allows for central administration of the wagering service.

In one suitable approach, racing videos and other services may be provided using servers and other equipment located at transaction processing and subscription management system 24. For example, video clips may be provided to the user on-demand. Interactive advertisements may be provided to the user. When the user selects a desired advertisement, transaction processing and subscription management system 24 may provide additional information or other services related to the advertisement to the user.

Product ordering services may be implemented using computer equipment at transaction processing and subscriber management system 24 to handle orders and to assist in adjusting the appropriate account of the user accordingly. Orders may be fulfilled using merchandise fulfillment facilities 34. Merchandise fulfillment facilities 34 may be operated solely to provide merchandise fulfillment or may be associated with independently-operated mail-order or on-line businesses. Similar facilities may be used to allow users to order services.

Statistical racing data such as the post times for each race, jockey names, runner names and the number of races associated with each track, handicapping information (e.g., information on past performances such as the number of wins and losses for the past year, etc.), and weather conditions at various tracks may be provided by racing data collection and processing system 28. Some of the data may be collected from racetracks 12 and some may be provided by third party information sources such as Axcis Pocket Information Network, Inc. of Santa Clara, Calif. or other suitable data sources.

Racing data may also be provided from totalisators 30. Totalisators 30 are the computer systems that may be used to handle wagers made at the racetracks, made at off-track betting establishments, and made using interactive wagering system 10. Totalisators 30 generate wagering odds in real time. Totalisators 30 generate these odds based on information on which wagers are being placed (e.g., based on information on which wagers are being placed on races at racetracks 12). Totalisators 30 are available from companies such as Amtote International, Inc. of Hunt Valley, Md. Totalisators 30 may be associated with individual racetracks 12 or groups of racetracks 12. Totalisators 30 may communicate with one another using a communication protocol known as the Intertote Track System Protocol (ITSP). This allows totalisators 30 to share wagering pools. Totalisators 30 may provide racing data including information on the current races at racetracks 12, the number of races associated with each racetrack, win, place, and show odds and pool totals for each horse or other runner, and exacta, trifecta, and quinella pay-off predictions and pool totals for every possible combination of runners. Totalisators 30 may also provide current odds and other real-time racing data for other types of wagers. Totalisators 30 may provide the time until post time for each race.

Totalisators 30 may provide race results, such as the order-of-finish list for at least the first three positions and payoff values versus a standard wager amount for win, place, and show, for each runner in the finish list. Payoff values may be provided for winning complex wager types such as exacta, trifecta, quinella, pick-n (where n is the number of races involved in the pick-n wager), and daily double. The payoff values may be accompanied by a synopsis of the associated finish list.

Totalisators 30 may also provide program information of the type typically provided in printed racing programs. Such program information may include early odds, early scratches, race descriptions (including the distance of each race and the race surface—grass, dirt, artificial turf, etc.), allowed class ratings (based on a fixed ratio of external criteria), purse value (payoff to winning runner), allowed age range of runners, and the allowed number of wins and starts for each runner.

One suitable approach, some of the information provided to transaction processing and subscription management system 24 by totalisators 30 (such as the program information or other suitable racing data) may be provided by racing data collection and processing system 28. Similarly, some of the information provided to transaction processing and subscription management system 24 by racing data collection and processing system 28 may be provided by totalisators 30. Moreover, the foregoing examples of different suitable types of racing data are merely illustrative. Any suitable data related to racing may be provided to transaction processing and subscription management system 24 if desired.

Transaction processing and subscription management system 24 provides the racing data to users at user television equipment 22, user computer equipment 20, and user telephone equipment 32 for use in following race results and developing wagers. If desired, racing data may be provided to users using paths that do not directly involve transaction processing and subscription management system 24. For example, racing data may be provided from racing data collection and processing system 28 to user television equipment 22, user computer equipment 20, or user telephone equipment 32 using the Internet or other suitable communications paths.

User telephone equipment 32 may be a conventional telephone, a cordless telephone, a cellular telephone or other portable wireless telephone, or any other suitable telephone equipment. Users at user television equipment 22 and user computer equipment 20 may view information on the racing data on a television or other suitable monitor. Users at user telephone equipment 32 may listen to racing data using an interactive voice system. User telephone equipment 32 may be based on cellular telephones with displays. Users may view racing data displayed on such displays.

Figure 4:
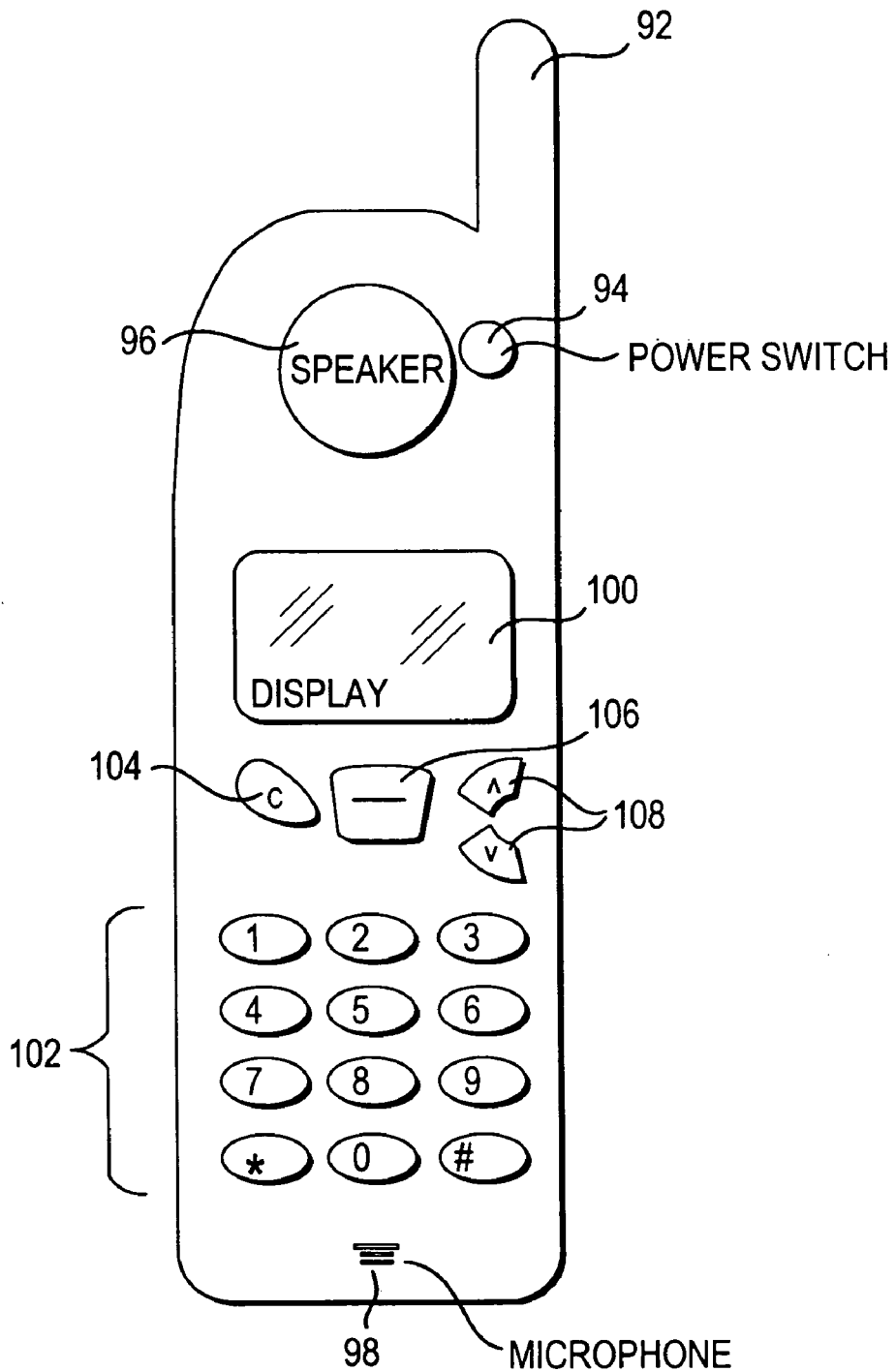
FIG. 4 is a schematic diagram of an illustrative user cellular telephone in accordance with one embodiment of the present invention.

An illustrative cellular telephone 90 with which the user may use the interactive wagering application is shown in FIG. 4. A portion of the software that is used to implement the interactive wagering service is resident on cellular telephone 90. Cellular telephone 90 may have a recording device for storing software instructions and videos and a processor for executing the instructions and displaying the videos.

Cellular telephone 90 may have an antenna 92 to support wireless communications with transaction processing and subscription management system 24, customer service facility 36, or video production system 14. A power switch 94 may be used to turn on and off cellular telephone 90. A speaker 96 allows the user to hear conversations and to hear audio prompts from transaction processing and subscription management system 24. A microphone 98 allows the user to converse with others. Display 100 may be a liquid crystal display (black and white or color), a plasma display, a light-emitting diode display, an active matrix display, or any other suitable type of small display screen. Keys 102 allow the user to enter inputs. Numeric keys 102 (including the star and pound key) allow the user to respond to interactive voice response system prompts such as "press 3 to select race 3" and allow the user to enter numbers to select numerically identified on-screen menu options and the like that are displayed on display 100. If desired, some of the numeric keys 102 may perform secondary functions if, for example, they are pressed and held for at least a predetermined length of time. Clear key 104 may be used to clear characters from display 100. If the user presses and holds clear key 104, the user may be taken back to the initial screen displayed on display 100 upon power up. Navigation key 106 may be used to access menus, make telephone calls, etc. Scroll keys 108 may be used to scroll through menus and to scroll through other items presented on display screen 100.

Figure 5:
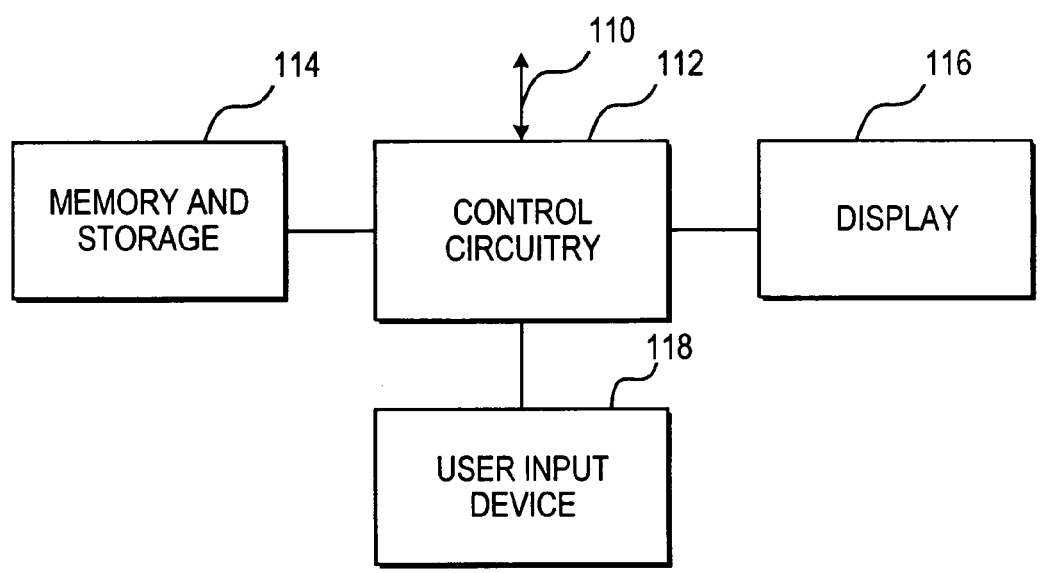
FIG. 5 is a schematic diagram of illustrative user equipment in accordance with one embodiment of the present invention.

A generalized schematic diagram of user equipment, such as user television equipment 22, computer equipment 20, and user telephone equipment 32 of FIG. 1 is shown in FIG. 5. Control circuitry 112 and memory and storage 114 may have communications and memory and processing circuitry for supporting functions such as receiving television programming and data (e.g., blackout information), recording videos in storage, sending data, automatically determining the geographic location of user equipment, restricting user wagering access, setting user determined restrictions, and accessing interactive services over line 110. Line 110 may connect to communications paths such as paths 42, 44c, 44d, 44f–i, 44m, 44n, and 44p of FIG. 1. Television programming and text, graphics, and video associated with interactive services may be presented to the user with display 116. Display 116 may be a television, a computer monitor, a LCD display screen, or any other suitable display equipment.

The user may interact with control circuitry 112 using any suitable user input interface 118, such as a remote control, a keyboard, a wireless keyboard, a display remote, a handheld computer, a mouse, a trackball, a touch pad, or any other suitable input device.

Referring back to FIG. 1, users who wish to place wagers may establish an account at transaction processing and subscription management system 24. An account may also be established at one of totalisators 30. The user and the interactive wagering services may have their own bank accounts at financial institutions 38. A user may set up an account electronically by using user television equipment 22, user computer equipment 20, or user telephone equipment 32 to interact with the subscriber management functions of transaction processing and subscription management system 24. If desired, accounts may be established with the interactive wagering service with the assistance of customer service representatives at customer service facility 36. Customer service facility 36 may be at the same location as transaction processing and subscription management system 24, may be part of system 24, or may be located remote from system 24. Customer service representatives at customer service facility 36 may be reached by telephone. If user telephone equipment 32 is used to access the interactive wagering service, for example, user telephone equipment 32 may be used to reach the customer service representative using communications path 42. If user television equipment 22 or user computer equipment 20 is being used with the service, a telephone at the same location as that equipment may be used to reach the customer service representative.

The user's identity may be checked using social security number information or other identification information with the assistance of subscriber verification facility 40. The services of subscriber verification facility 40 are used to ensure that the user lives in a geographic area in which wagering is legal, that the user is of a legal age, and that the identification information (e.g., the user's social security number) matches the name provided by the user. If the user is using a cellular telephone or handheld computing device, the user's present physical location may be determined by determining which general part of the cellular telephone network is being accessed by the user. In another suitable approach, the user's present physical location may be determined by using the cellular network or a handset-based location device, such as a global positioning satellite (GPS) receiver in the body of the cellular telephone, to pinpoint the user's location. This location information may be used to verify that the user is located in a geographic area where wagering is legal.

In a typical enrollment process, the user may provide personal information to the interactive wagering service and provides funds with a credit card or funds from the user's bank account. The interactive wagering service may set up an account for the user at transaction processing and subscription management system 24 and directs one of totalisators 30 to set up a new account for the user at the totalisator. The totalisator may be directed to credit the user's account to reflect the amount of funds provided by the user. After the user places a wager and wins or loses, the totalisator may adjust the user's totalisator account to reflect the outcome of the wager. The totalisator may periodically inform the interactive wagering service of the adjusted balance in the user's account. This may be accomplished using any suitable technique, for example, periodically, continuously, on-request, or by any other suitable technique.

In one suitable approach, reports may be collected periodically, for example, once a day in an end-of-day report, and provided to the interactive wagering service to reconcile the account balances at transaction processing and subscription management system 24 with the account balances at totalisators 30.

If the user makes a balance inquiry, the inquiry may be passed to the appropriate totalisator by transaction processing and subscription management system 24. If the user is charged a fee for subscribing to the service, the service may debit the fee from the user's account at the transaction processing and subscription management system 24.

The accounts at totalisators 30 and transaction processing and subscription management system 24 are typically maintained separately, because the business entities that operate totalisators 30 and transaction processing and subscription management system 24 are independent. If desired, financial functions related to opening and maintaining user accounts and the like may be handled using computer equipment at another location such as one of financial institutions 38 or other location remote from totalisators 30 and system 24. Such financial functions may also be implemented primarily at a totalisator 30 or primarily at the transaction processing and subscription management system 24.

Users at user television equipment 22, user computer equipment 20, and user telephone equipment 32 may place wagers by providing wagering data and otherwise interacting with transaction processing and subscription management system 24. The interactive wagering service may provide a user at user television equipment 22, user computer equipment 20, or user telephone equipment 32 that has display capabilities with screens containing various racing data. For example, the user may be presented with screens that allow the user to view the current odds for horses in an upcoming race at a given track.

The service may provide the user with interactive screens containing menus and selectable options that allow the user to specify the type of wager in which the user is interested and the desired wager amount. With an a set-top box arrangement, for example, the user may use a remote control or wireless keyboard to navigate the various menus and selectable options. With a personal computer, the user may use a keyboard, mouse, trackball, touch pad, or other suitable input or pointing device. With a cellular telephone with a display, the user may use buttons on the telephone. In an electronic book arrangement, for example, the user may press dedicated buttons on the electronic book or may select on-screen options by touch or by using handwriting recognition. When the user has made appropriate selections to define a desired wager, the user television equipment 22, user computer equipment 20, or user telephone equipment 32 may transmit wagering data for the wager to transaction processing and subscription management system 24.

Users with telephones may also interact with the service using an interactive voice response system located at transaction processing and subscription management system 24. The interactive voice response system may present menu options to the user in the form of audio prompts (e.g., "press 1 to select a $2 wager amount," etc.). The user may interact with the service be pressing the corresponding buttons on a touch tone telephone. User telephone equipment 32 that is based on cellular telephones allows the user to interact with the wagering service in this way. User telephone equipment 32 that is based on cellular telephones with messaging and display capabilities also allows the user to interact visually with the interactive wagering service.

The components of interactive wagering system 10 may be interconnected using various communications paths 44. Communications paths 44 may include satellite paths, coaxial cable paths, fiber-optic paths, twisted pair paths, other wire or cable-based links, wireless paths through free space, or any other suitable paths or combination of such paths. Communications over paths 44 may involve analog transmissions, digital transmissions, wireless transmissions, microwave transmissions, radio-frequency transmissions, optical transmissions, audio transmissions, or any other suitable type of transmissions or combination of such transmissions. Communications may involve Internet transmissions, private network transmissions, packet-based transmissions, television channel transmissions, transmissions in the vertical blanking interval of a television channel or on a television sideband, MPEG transmissions, etc. Communications may involve wireless pager or other messaging transmissions. Communications paths 44 may include cable connected to cable modems, digital subscriber lines, integrated services digital network (ISDN) lines, or any other suitable paths. Examples of suitable communications paths are described below. Those examples are, however, merely illustrative. Any of the communications path arrangements described above or other suitable arrangements may be used if desired.

Communications paths that carry video and particularly uncompressed analog video or lightly-compressed or full-screen digital video generally use more bandwidth than communications paths that carry only data or that carry partial-screen digital video. For example, to transmit high-quality simulcasts of races from racetracks 12 to video production system 14, analog or digital videos may be transmitted from racetracks 12 to video production system 14 over path 44a using satellite links. Video may be transmitted from studio 16 to video production system 14 over path 44b using a satellite link or a high-speed terrestrial path such as a fiber-optic path. Studio 16 may also be located at the same site as video production system 14, thereby avoiding the need for a long-haul transmission path. Videos may be transmitted from video production system 14 to user computer equipment 20 over path 44c using a modem link (using, for example, a digital subscriber line, a telephone network link, a wireless link etc.). The modem link may be made over a private network.

A user with a cable modem may connect a personal computer or other user computer equipment 20 to an associated cable system headend using path 44d. The headend in such an arrangement would be one of the television distribution facilities 18 shown in FIG. 1. The user may then receive videos from the headend via cable modem. Videos may be provided to the headend over path 44e using a network link, fiber optic links, cable links, microwave links, satellite links, etc. A user with a set-top box or similar device, shown in FIG. 1 as user television equipment 22, may receive videos from a cable system headend using a cable modem or other such communications device over path 44f. In addition, a user with user television equipment 22 may receive videos over the Internet or a private network using a telephone-based modem or other such communications device using path 44g. In a system with distributed processing, interactive wagering services may be provided using a television distribution facility 18 that includes equipment that supplements or replaces at least some of the equipment at transaction processing and subscription management system 24.

In one suitable approach, user television equipment 22 or user computer equipment 20 may receive analog or digital videos from an associated television distribution facility 18 over the communications paths normally used to distribute television programming, such as paths 44*f* and 44*d*. For example, videos may be received as part of a dedicated interactive wagering service television channel. If videos are provided as digital signals, for example, MPEG signals, 10 or more digital videos may be carried on a single analog channel. If the videos are not full-screen videos, even more videos may be simultaneously provided without a loss of image quality.

Racing videos may be provided to user telephone equipment 32 over a partially-wireless telephone Internet link or other telephone link using path 44*n*.

Racing data may accompany the racing videos along any of these paths. Moreover, racing videos may be provided by routing them directly from racetracks 12 to user television equipment 22, user computer equipment 20 (e.g., over the Internet or a private network, etc.), or user telephone equipment 32. Racing videos may also be provided by routing them through transaction processing and subscription management system 24. If a cellular telephone or portable computing device has sufficient display capabilities to support moving images, racing videos may be displayed. Such videos may be provided using any suitable path, such as a direct path from racetracks 12, a path through video production system 14 or other suitable video processing equipment, through a hub such as transaction processing and subscription management system 24, etc. Racing videos may be provided in real time or may be recorded for later distribution. Videos that are not provided in real-time may be downloaded by user television equipment 22, user computer equipment 20, a cellular telephone, or other suitable user equipment at a lower data rate than would otherwise be required and may be downloaded in the background if desired. Such videos may also be provided to the user at real-time video rates for direct viewing by the user.

Racing data and other information related to the interactive wagering service may be provided to users over paths connected to transaction processing and subscription management system 24. For example, racing data and other data for the service may be provided to user computer equipment 20 over path 44*h* using a modem link. Path 44*h* may be a private network path or an Internet path. Path 44*h* may use telephone lines, digital subscriber lines, ISDN lines, wireless data paths, or any other suitable type of communications links. User television equipment 22 may receive data for the wagering service over communications path 44*i*, which may be a telephone line, digital subscriber line, ISDN line, or other suitable type of communications path and which may use a private network path or an Internet path, etc.

Data for the wagering service may be provided to users of the interactive wagering application via communications path 44*j* and paths 44*f* and 44*d*. Communications path 44*j* may be provided over a private network, using the public telephone network, using satellite links, or any other suitable type of links. Data from paths such as path 44*j* may be routed to paths such as paths 44*f* and 44*d* directly by associated television distribution facilities 18, or may be buffered at television distribution facilities 18 if desired. Paths 44*f* and 44*d* may include coaxial cable and use of paths 44*f* and 44*d* may involve the use of cable modems or the like. If data is provided over path 44*j* and path 44*f* or path 44*d* using an Internet protocol, a web browser or similar software running on user television equipment 22 or user computer equipment 20 may be used to access the data. Such software may be integrated into the interactive wagering application or may be used separately. Software may also be used to view videos and may be used on other platforms (e.g., advanced cellular telephones) if desired.

The communications paths 44*k* that are used to connect various other components of the system typically do not carry high-bandwidth video signals. Accordingly, paths 44*k* may be telephone-like paths that are part of the Internet or a private network. Such paths and various other paths 44 may be dedicated connections for security, reliability, and economy.

User telephone equipment 32 may receive information for the wagering service via path 44*m*. If user telephone equipment 32 is a standard (non-cellular) telephone, such information may be in the form of audio prompts, such "press 1 to place a wager," and audio racing data, "the current win odds for horse 2 are 5-1. " Transaction data processing and subscription management system 24 may contain interactive voice response equipment that provides such information to the user and that responds to touch-tone signals from the user when the user responds to prompts by pressing buttons on the user's telephone.

If user telephone equipment 32 is a cellular telephone, racing data and other information for the interactive wagering service may be provided to the user by using a cellular wireless connection as part of path 44*m*. Users with cellular telephones may be provided with audio prompts using an interactive voice response system located at transaction processing and subscription management system 24 to which the users may respond by pressing cellular telephone buttons to generate touch-tone signals.

Racing data and other information for the interactive wagering service may be provided to cellular telephones in the form of alphanumeric messages. Such messages may be transmitted to the user by using paging or other alphanumeric messaging formats or any other suitable data communications scheme. In one suitable approach, data may be provided to the cellular telephones over the voice channel and decoded by the cellular telephone using modem circuitry or other suitable circuitry. Data may also be provided using any other suitable cellular or wireless path. Regardless of the way in which racing data and other information for the interactive wagering service are provided to the cellular telephone, such information may be provided to the user by displaying it on the cellular telephone display screen or by presenting it in audible form through the speaker of the cellular telephone.

Racing data and other interactive wagering service information for the users may be provided in one or more continuous data streams, may be provided periodically (e.g., once per hour or once per day), or may be provided using a client-server arrangement in which data is requested by a client processor (e.g., user television equipment 22, user computer equipment 20, user telephone equipment 32, or any other such equipment) from a server (e.g., a server implemented using computer equipment 26 at transaction processing and subscription management system 24 or computer equipment at another suitable location). Videos may also be provided using any of these techniques.

A return communications path between the user and the interactive wagering service may be used to allow the user to place wagers and otherwise interact with the interactive wagering service. For example, a user with a standard telephone or a cellular telephone may interact with the service by pressing touch-tone keys on the telephone in response to audio prompts provided by an interactive voice response system at transaction processing and subscription management system 24. In one suitable approach, users may call customer service representatives at customer service facility 36 and place wagers with manual assistance. The user of a cellular telephone may interact with the wagering service by selecting menu options and otherwise interacting with information displayed on the cellular telephone. When a selection is made, software implemented on the telephone may be used to assist the user in transmitting appropriate data, for example, wagering data, to the wagering service. Such data may be transmitted using any suitable technique. For example, data may be transmitted using a wireless data link that is separate from the cellular voice channels. Data may also be transmitted over the voice channel, for example, using a modem built into the cellular telephone, by automatically generating touch-tone signals that may be recognized by the interactive voice response system at transaction processing and subscription management system 24, or using any other suitable arrangement. These approaches may be used even if the user receives racing data and other information for the service using a platform other than a telephone-based platform.

Users with user television equipment 22 may interact with the service by sending data (e.g., wager data) to transaction processing and subscription management system 24 using path 44i or using paths 44f and 44j. Users with user computer equipment 20 may send data (e.g., wager data) to transaction processing and subscription management system 24 via path 44h or paths 44d and 44j. Users of user equipment 111 may send data for the service to locations other than transaction processing and subscription management system 24. For example, the user may provide information directly to customer service facility 36, etc.

In one suitable approach, the user may send data to the service at transaction processing and subscription management system 24 using different paths than those used to receive data from transaction processing and subscription management system 24. For example, racing data may be received at user television equipment 22 via paths 44j and 44f, whereas data may be sent by the user from user television equipment 22 to transaction processing and subscription management system 24 using path 44i, etc. Moreover, the paths used to receive certain video information may be different from those used to receive racing data. For example, user television equipment 22 may receive racing videos using path 44f, but may receive racing data using path 44i. These examples are merely illustrative. Any suitable combination of paths may be used to distribute racing data and other information for the interactive wagering service, any suitable combination of paths may be used to receive videos, and any suitable combination of paths may be used to send data to the wagering service.

In one suitable approach, the user may interact with the wagering service using more than one platform. For example, the user may place a wager using a cellular telephone while the user is driving home. When the user arrives home, the user may determine the outcome of the wager by watching a video of the race on user television equipment. Later in the day, the user may check the user's account balance using a personal computer. This is merely an illustrative example. The various wagering platforms may be used in any suitable combination.

In addition, the user may configure the system so that wagering-related video content may be displayed on one device (e.g., a television display or other user television equipment), whereas interactive wagering opportunities (e.g., on-screen wager-creation options) may be displayed on another device (e.g., a personal computer display or other user computer equipment or a cellular telephone display or other user telephone equipment). The delivery of the content and interactive wagering opportunities to such devices may be coordinated. If desired, paths such as paths 44p may be used in coordinating the delivery of television or other video content and interactive wagering opportunities or other interactive content. For example, a path 44p between a set-top box in a user's television equipment 22 and that user's computer equipment 20 may be used to send signals from the set-top box to the user's computer equipment 20 that cause the user's computer equipment 20 to display certain interactive wagering opportunities to the user (e.g., by retrieving certain web pages). Such signals may be sent, for example, when the set-top box determines that the user has tuned to a wagering-related television channel with the set-top box. This is merely illustrative. Any suitable arrangement may be used to send signals or otherwise coordinate the operation between a first user device and a second user device.

Interactive wagering system 10 has been described in the context of a system that supports multiple wagering platforms. In another suitable approach, interactive wagering system 10 may support fewer platforms. For example, aspects of the invention may be implemented using an interactive wagering system 10 that only supports cellular telephone wagering or wagering using handheld computer devices. In one suitable approach, interactive wagering system 10 may be configured so that it does not support personal computer wagering, wagering with standard telephones, or wagering with user television equipment. The system may support cellular telephones and/or handheld computing devices such as personal digital assistants, palm-sized computers, or any other suitable computing device, in combination with any other suitable platform.

The features of the present invention are described herein primarily in the context of an interactive wagering application implemented on user television equipment. This is only illustrative. An interactive wagering application implemented on any suitable platform (user computer equipment, user telephone equipment, or any other suitable platform) may be used to provide such features if desired. In set-top box arrangements, on-screen options (e.g., create wager) may be made larger than they appear in computer-based arrangements to accommodate the greater viewing distance from which televisions are typically operated. Options may be selected by highlighting them using remote control arrow keys and by pressing an appropriate key such as an OK or enter or select key. In cellular telephone arrangements and handheld computer arrangements, options and information may be displayed using smaller screens than are typically available on personal computer or set-top box arrangements. To accommodate the smaller screen size, options that might otherwise be presented on a single screen may be displayed using multiple screens or layered menus. Options may be selected by highlighting them using navigation keys and pressing an appropriate select button on the cellular telephone or handheld computing device or by using a pen-based interface or the like.

The interactive wagering application may be implemented using application software that runs primarily on user television equipment, user computer equipment, user telephone equipment, or another local platform, or using a remote server or other computer that is accessed from the local platform. Arrangements in which interactive wagering services are implemented using software on remote computers that is accessed on-demand from local platforms may be referred to as client-server arrangements. Such client-server arrangements may be used to allow client processes on set-top boxes or other platforms to access server processes running on servers located at cable system headends or other television distribution facilities 18 (FIG. 1). Regardless of the type of system architecture or platform used, the software that supports the interactive wagering service features described herein may be referred to as an interactive wagering application.

In a set-top box environment, the system may allow the user to launch the application by selecting a menu option in an interactive television program guide or other set-top box application or menu. If desired, the application may be launched automatically whenever the user tunes to a particular channel (e.g., the television wagering channel). After the user has tuned to this channel, the system may display an interactive icon on the user's television screen that indicates that the interactive wagering application is available. If the user presses an "OK" remote control key, the system may launch the application.

In a computer-based system, the user may access the interactive wagering application by browsing to an Internet web site or a site on a private network or by otherwise connecting to computing equipment such as computing equipment 26 of transaction processing and subscription management system 24 (FIG. 1) or other suitable computer equipment.

Interactive wagering systems based on cellular telephones or the like may be launched by selecting an appropriate on-screen menu option presented on the display of the cellular telephone.

Interactive wagering system 10 is shown to be compatible with various forms of user equipment (e.g., computers, telephones, television equipment, etc.). For purposes of brevity and clarity, and not by way of limitation, the interactive wagering application of the present invention is primarily described herein in conjunction with the use of user television equipment 22. It should be understood that this is merely an illustrative embodiment of the present invention, and that any other suitable user equipment or combination of user equipment may be used.

The present invention is directed to systems and methods for restricting wagering access to a user of an interactive wagering application. The interactive wagering application may restrict wagering access based on the user equipment location, based on user-defined wagering restrictions, based on any other suitable criterion, or based on any combination thereof. When the user attempts to place a wager, the interactive wagering application may determine if user is located at a location that allows wagering. If the user is located at a location where wagering is illegal or otherwise not allowed, the interactive wagering application may prevent the user from accessing interactive wagering features, such as a feature that may provide the user with the ability to create a wager. In another suitable approach, the interactive wagering application may restrict wagering access based on user-defined wagering restrictions, such as restricting wagering access during a certain time of the day.

Figure 6:
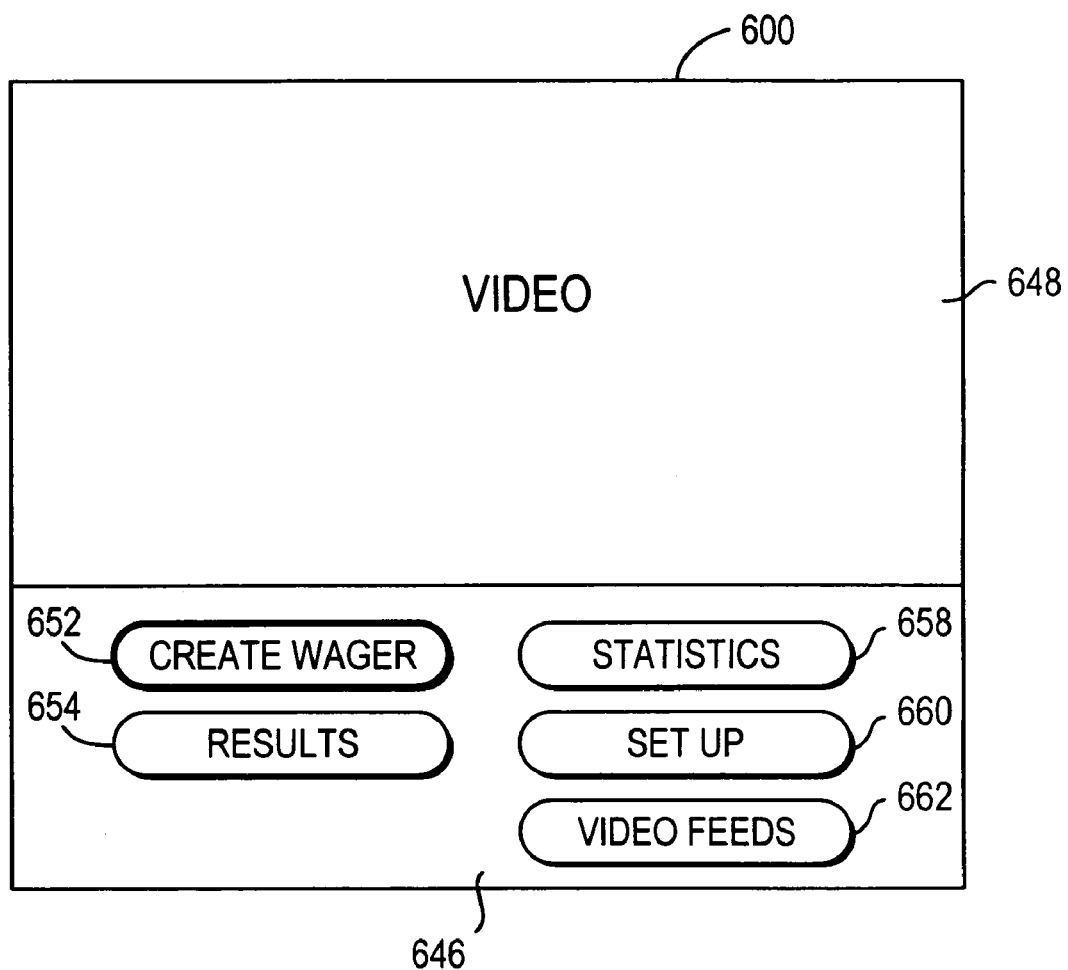
FIG. 6 shows an illustrative interactive wagering application screen that may indicate to the user that wagering access has been restricted in accordance with one embodiment of the present invention.

FIG. 6 shows an illustrative display screen 600 that may be displayed by the interactive wagering application. The interactive wagering application may display region 646 on top of video 648 in display screen 600. In another suitable approach, the interactive wagering application may provide menu information in a reduced-size window. The menu information may provide the user with wagering features or options in the form of text, graphics, or both. Video such as video 648 may also be displayed in such a reduced-size window. In another suitable approach, display region 646 may be displayed as a full-screen menu that fills screen 600.

Menu region 646, or any other suitable menu arrangement, may be used to provide the user with suitable selectable options. For example, option 652 may be used to provide the user with the ability to create a wager. The interactive wagering application may provide results option 654, which the user may select to view race results or view any other suitable information. Other options such as statistics option 658, setup option 660, and video feeds option 662, or any other suitable option may be included in menu region 646.

The user may select, for example, setup option 660 to setup user-defined wagering restrictions. For example, password protection, time-based restrictions, or any other suitable user-defined wagering restriction may be set by the user. For example, the user-defined wagering restrictions may be used as a parental control feature, to prevent unwanted use of wagering features (e.g., by a housekeeper, guests, intruders, etc.) or for any other suitable purpose.

Figure 7:
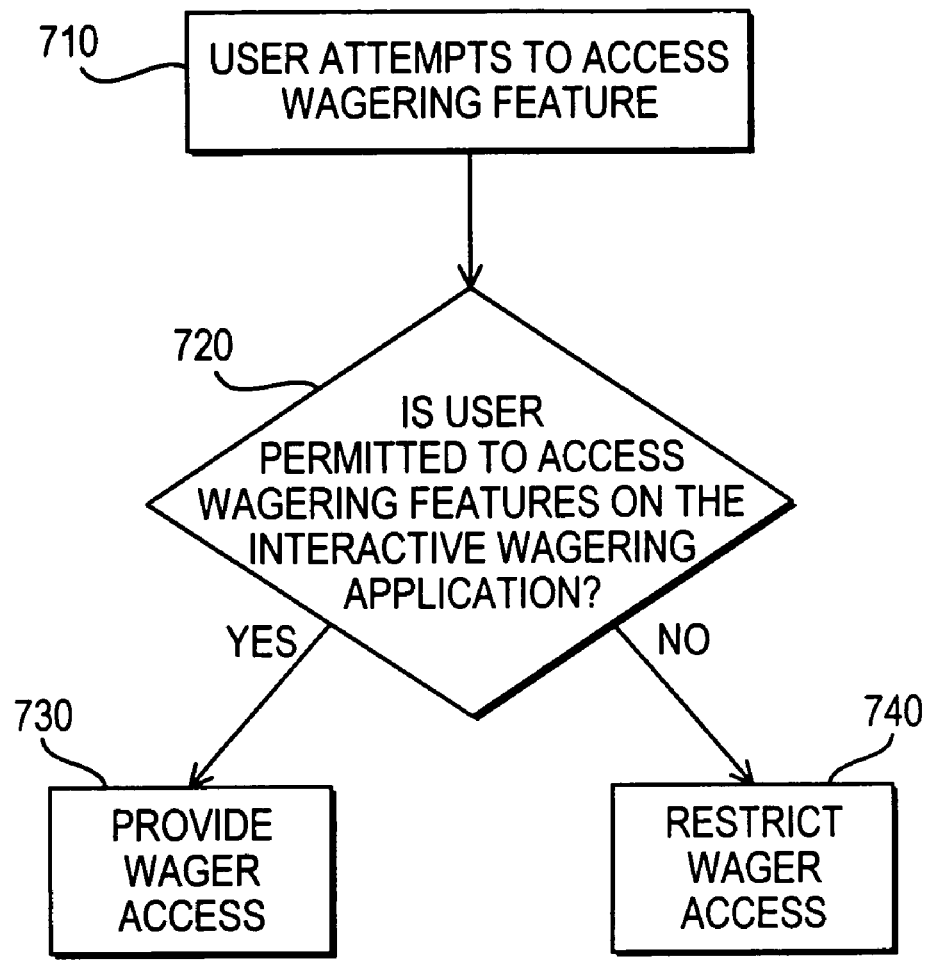
FIG. 7 is a flow chart of illustrative steps involved in providing or restricting wagering access in accordance with one embodiment of the present invention.

FIG. 7 is flow chart of illustrative steps involved in providing or restricting wagering access using the interactive wagering application. At step 710, the user may attempt to access a wagering feature of the interactive wagering application.

At step 720, the interactive wagering application may determine if the user is permitted to access the wagering features provided by the interactive wagering application. In one suitable approach, wagering access may be determined based on the location of the user equipment in which the interactive wagering application is provided. In another suitable approach, wagering access may be determined by user-defined wagering restrictions.

If the interactive wagering application determines that user may be provided with access, then the user may be provided with the ability to access the wagering features, as shown in step 730.

If the interactive wagering application determines that the user may not be provided with access, then the user may be restricted from accessing the wagering features, as shown in step 740.

The steps shown in FIG. 7 are merely illustrative. Additional steps may be added and one or more steps may be omitted or modified.

The interactive wagering application may allow the user to set user-defined wagering restrictions using, for example, interactive screens having menus with selectable options.

Figure 8:
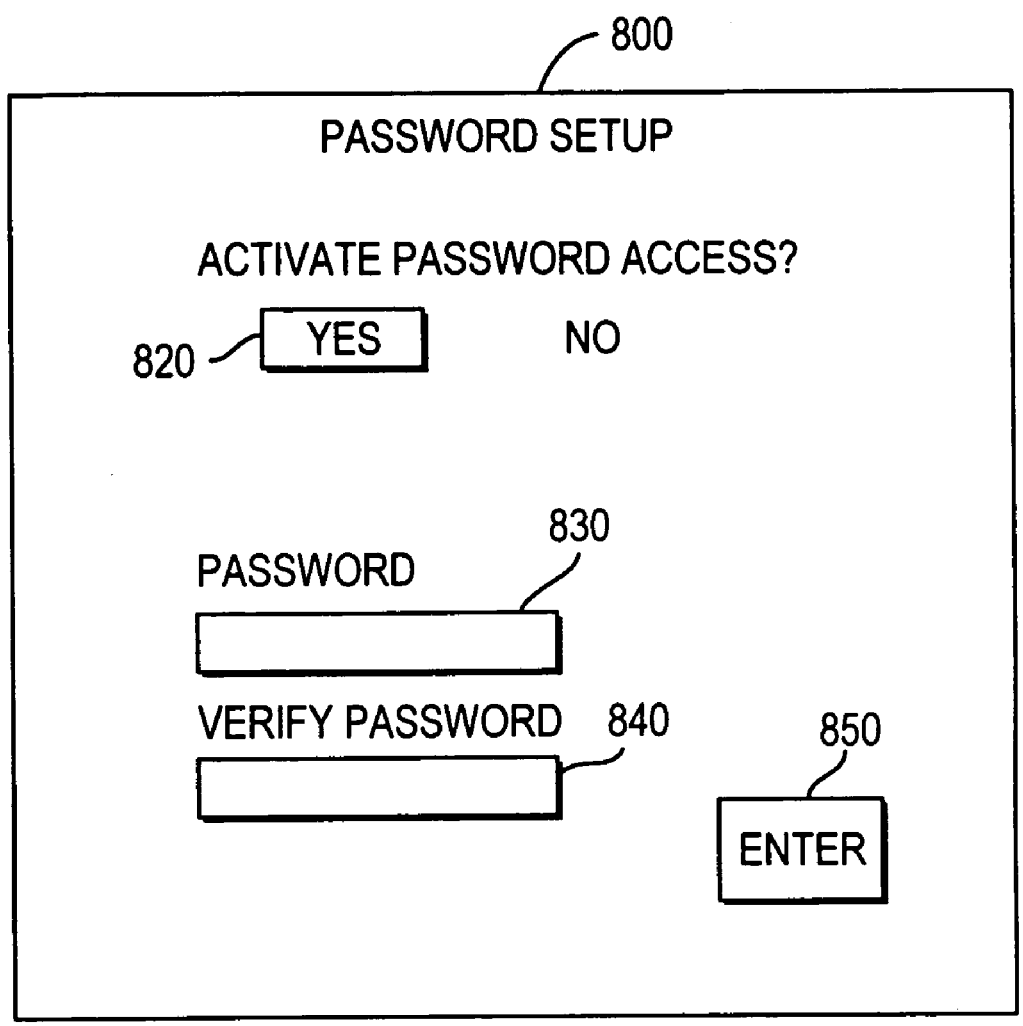
FIG. 8 shows an illustrative interactive wagering application screen for setting up user-defined password in accordance with one embodiment of the present invention.

For example, FIG. 8 shows an illustrative display screen 800 that may be displayed by the interactive wagering application to allow the user to setup a wagering access password. The interactive wagering application may provide the user with the ability to activate or deactivate password access by, for example, moving highlight 820 to the desired position. If a password has not been created or if the user wishes to change an existing password, password field 830 and verify password field 840 may be displayed on display screen 800. The user may provide a password by entering, for example, an alpha-numeric combination in fields 830 and 840. Enter button 850 may be provided to confirm the activation or deactivation of a password. Display screen 800 is merely illustrative. Any suitable arrangement may be used for password setup.

Figure 9:
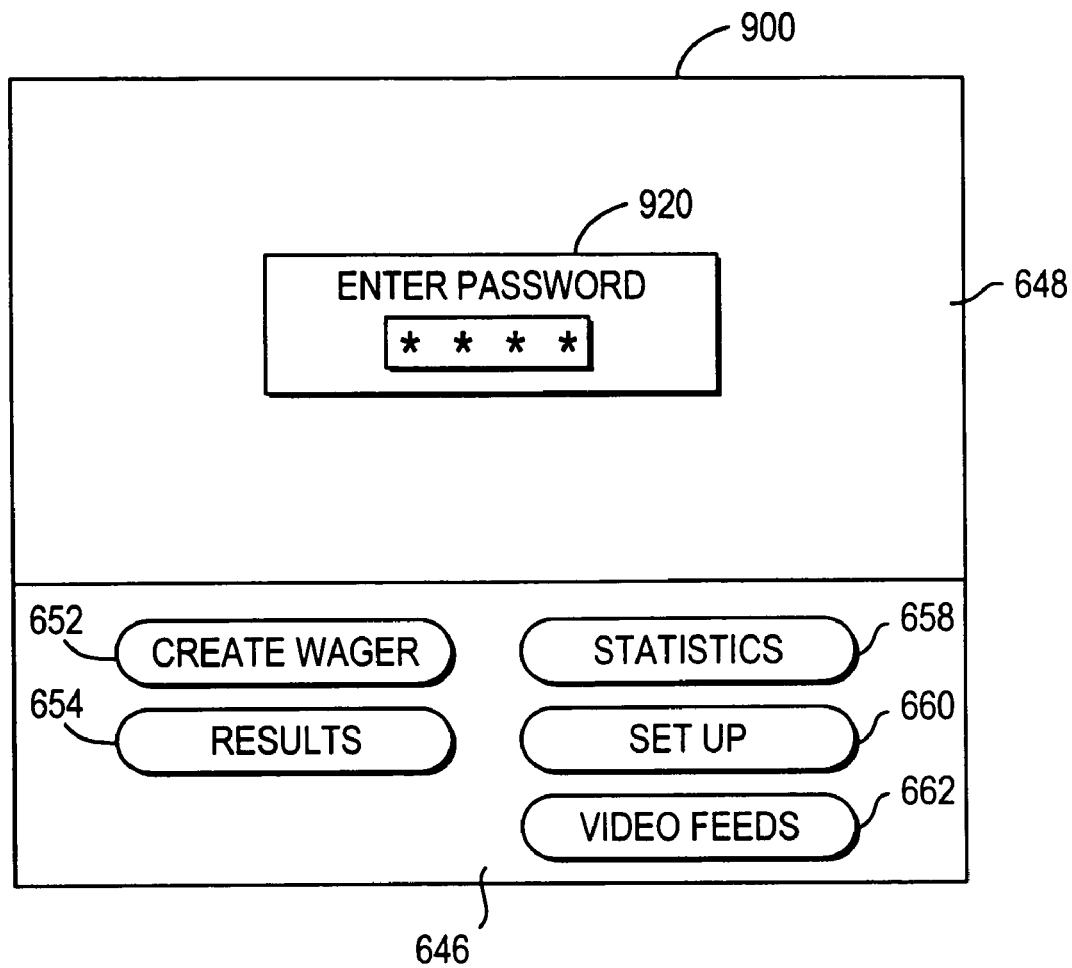
FIG. 9 shows an illustrative interactive wagering application screen requesting a password in accordance with one embodiment of the present invention.

FIG. 9 shows an illustrative display screen 900 that may prompt the user for a password using, for example, prompt overlay 920. Password prompt overlay 920 may provide the user with the ability to enter a password so that the interactive wagering application may provide wagering access to the user. Password protection may prevent, for example, undesired wager access to the wagering interface even if the user (e.g., children, intruders, etc.) is in a location where wagering is allowed.

Figure 10:
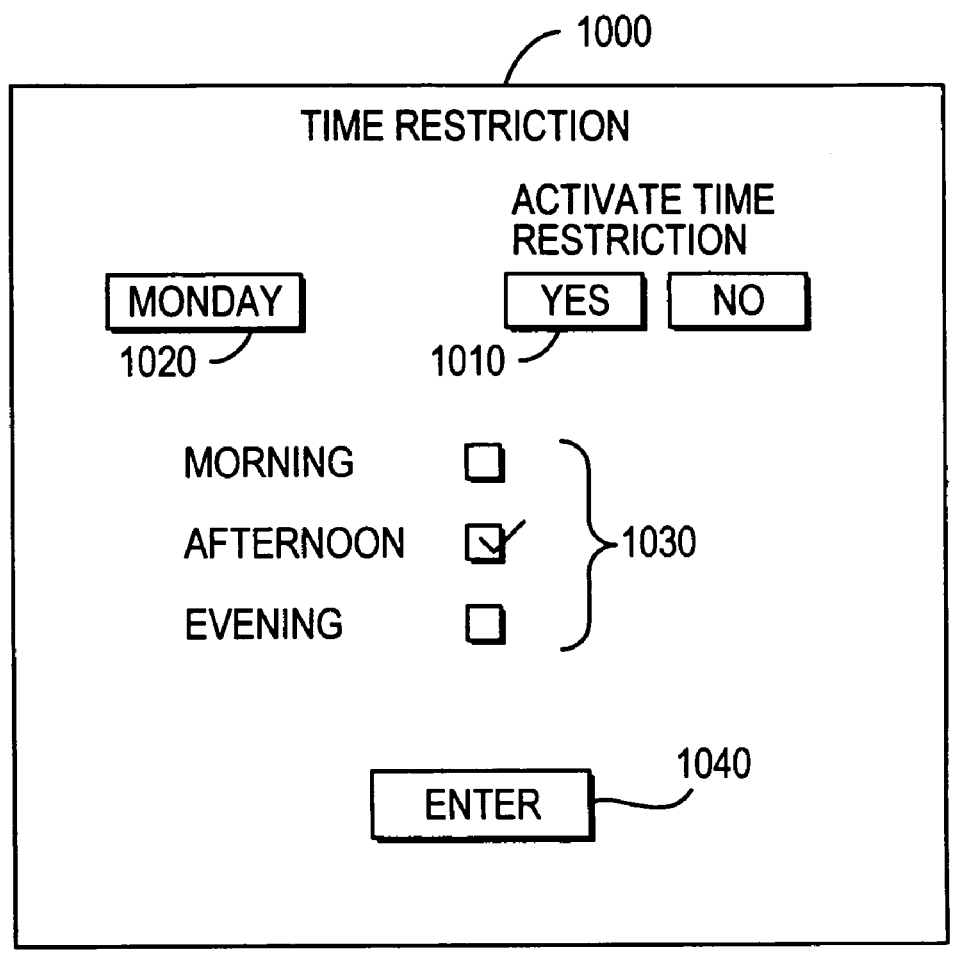
FIG. 10 shows an illustrative interactive wagering application screen for setting up user-defined time-based wagering restrictions in accordance with one embodiment of the present invention.

FIG. 10 shows an illustrative display screen 1000 that may provide the user with the ability to specify time periods during which wager access may be restricted. The user may be given the ability to activate or deactivate time-based restrictions by, for example, moving highlight 1010 to the desired position. The user may be provided with the ability to create a customized time-based restriction schedule. The day for which the user may select time-based restrictions may be changed or viewed in day field 1020. During any day, the user may manually select specific times for which wagering features are restricted in time selection field 1030. Enter button 1040 may be provided to confirm the selection, if any, of time-based restrictions. Display screen 1000 is merely illustrative. For example, the user may be provided with the ability to select general time frames (e.g., morning, afternoon, evening, etc.) to restrict wagering access. Any such suitable approach may be used.

Figure 11:
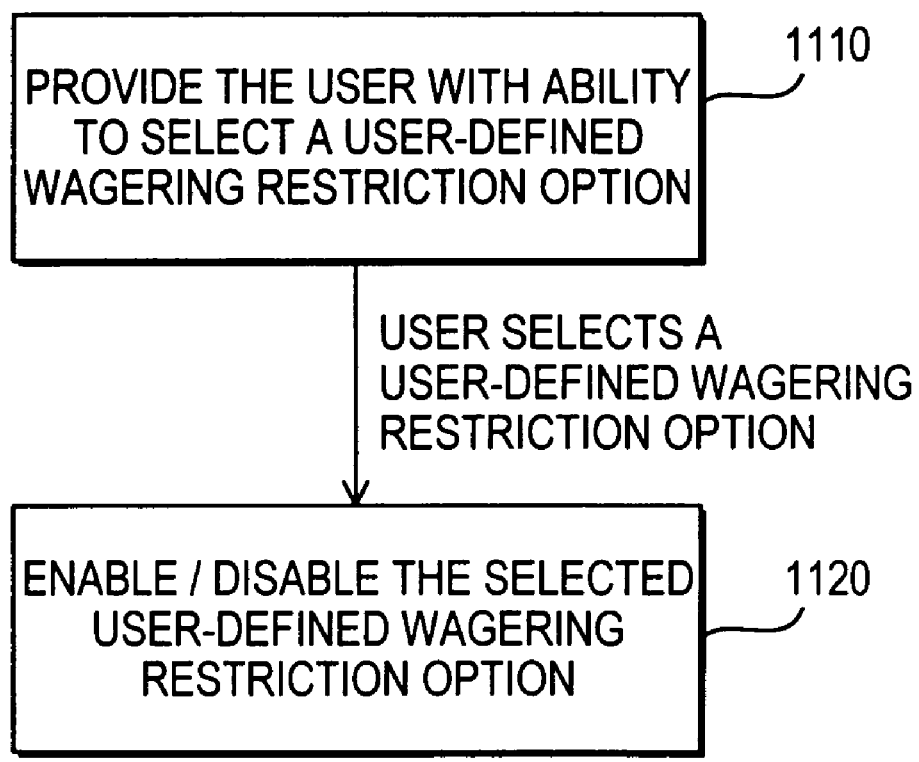
FIG. 11 is a flow chart of illustrative steps involved in providing user-defined restrictions in accordance with one embodiment of the present invention.

FIG. 11 is a flow chart of illustrative steps involved in allowing the user to set user-defined wagering restrictions. User-defined wagering restrictions may be, for example, password protection, time-based restrictions, or any other suitable restrictions. At step 1110, the interactive wagering application may provide the user with the ability to select a user-defined wagering restriction option. For example, the user may select the password restriction option.

At step 1120, the interactive wagering application may provide the user with the ability to enable or disable the user-defined wagering restriction option selected by the user. For example, the user may activate the password restriction by selecting an activation button provided by the interactive wagering application. Once activated, the interactive wagering application may restrict wagering access by requiring the user to enter the password.

The steps shown in FIG. 11 are merely illustrative. Additional steps may be added and one or more steps may be omitted or modified.

In one suitable embodiment, the interactive wagering application may restrict wagering access based on the geographical location of the user equipment. In one aspect of the invention, the interactive wagering application may restrict wagering access based on blackout information and location information. The interactive wagering application may compare the blackout information received by the user equipment to the location information provided by, for example, a location detection device that may be integrated with the user equipment. When the location information matches the blackout information, the interactive wagering application may restrict wagering access (i.e., when blackout information identifies locations that do not allow wagering). For example, the user may travel across the country in a recreational vehicle that may be equipped with user television equipment, such as a digital broadcast satellite system. When the user travels into a location where wagering is prohibited (e.g., according to the received blackout information), the interactive wagering application may prevent user access to the wagering service until the user travels to a location that allows wagering or if the blackout information changes.

The interactive wagering application may compare the blackout information to the location information in real-time to provide substantially instantaneous access or restriction to the wagering features. In another suitable approach, the interactive wagering application may compare the blackout information and the location information periodically (e.g., daily, weekly, etc.), via polling, on-demand, or using any other suitable approach.

Figure 12:
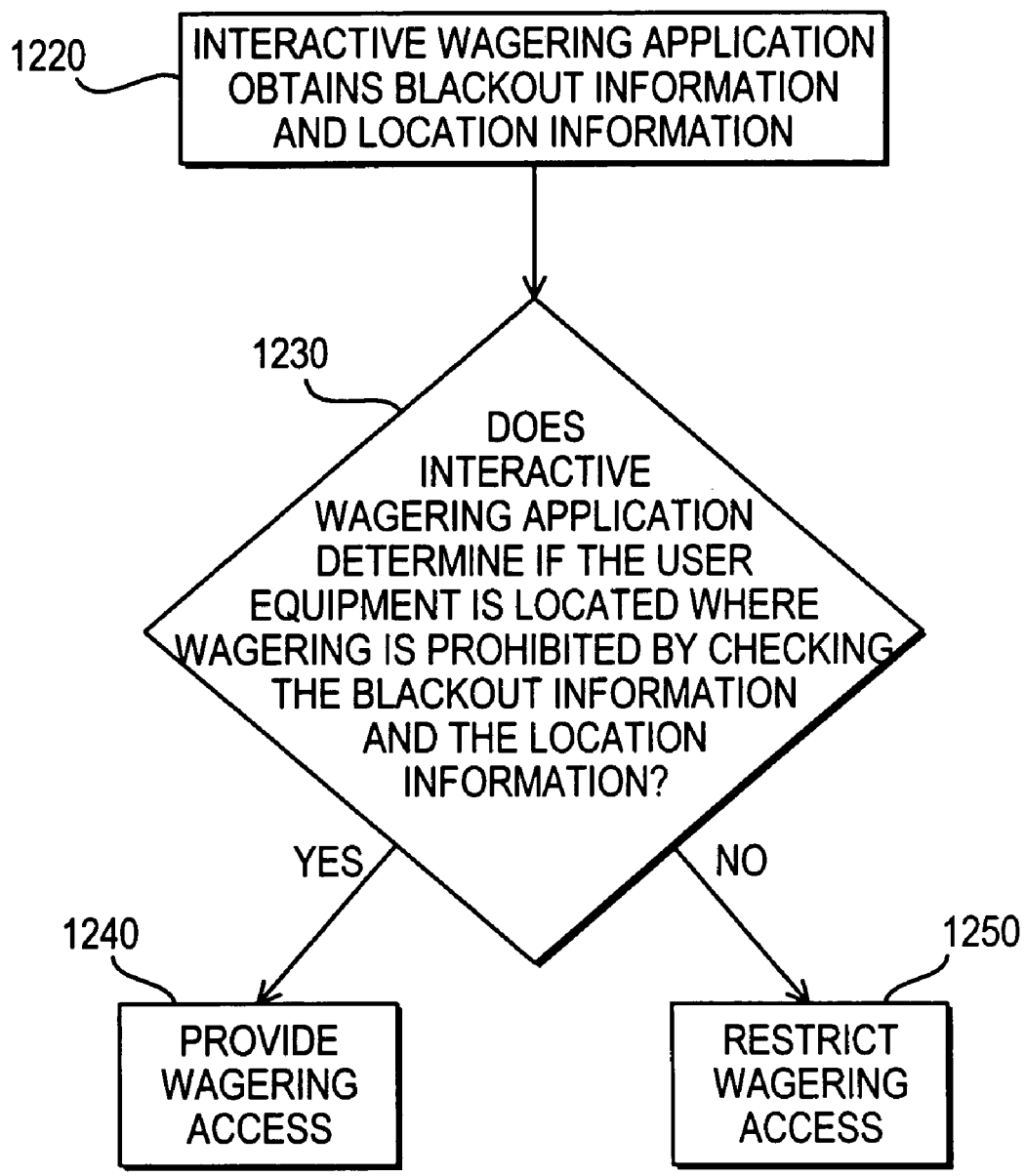
FIG. 12 is a flow chart of illustrative steps involved in restricting wagering access based on the user equipment location in accordance with one embodiment of the present invention.

FIG. 12 is a flow chart of illustrative steps involved in restricting wagering access based on the user equipment location.

At step 1220, the interactive wagering application may obtain blackout information and location information. For example, the blackout information may contain information that indicates that the state of Oklahoma prohibits wagering. The location information may provide the interactive wagering application with the user equipment location. For example, the location information may indicate that the user equipment is located in Oklahoma.

At step 1230, the interactive wagering application may check the blackout information and the location information to determine if the user is in a location where wagering is prohibited. For example, the interactive wagering application may check the blackout information to determine the locations where wagering is prohibited. The interactive wagering application may then check the location information to determine if the user is in one of those locations where wagering is prohibited (i.e., as indicated by the blackout information).

If one of the locations identified by the blackout information matches with the location information of the user equipment (i.e., as determined from the location information), the interactive wagering application may restrict wagering access as indicated in step 1240.

Alternatively, if the locations identified by the blackout information does not match with the location information of the user equipment (i.e., as determined from the location information), the interactive wagering application may provide wagering access as indicated in step 1250.

The steps shown in FIG. 12 are merely illustrative. Additional steps may be added and one or more of the steps may be omitted or modified.

In another suitable approach, interactive wagering system 10 (e.g., transaction processing and subscription management system 24, subscriber verification facility 40, totalisators 30, user equipment or any other suitable component or combination of components of interactive wagering system 10) may determine whether the user equipment is located where wagering is prohibited. Interactive wagering system 10 may obtain location information in any suitable way. For example, interactive wagering system 10 may obtain location information by having the interactive wagering application access a telephone network to obtain automatic number identification (ANI) information, by accessing relevant Internet service provider (ISP) information, or by using any other suitable technique for obtaining location information.

In one suitable embodiment, interactive wagering system 10 may direct the user equipment and interactive wagering application to establish a dial-up connection with a location tracing service using, for example, a toll-free telephone number or the like. During the dial-up connection, interactive wagering system 10 may determine the location of the user equipment by having the location tracing service analyze the ANI information or any other suitable telephone information. ANI information may include information in the form of country, state, county, municipality, city, residence, or any other suitable location information in which the user equipment may be located. In one suitable approach, ANI information may include a telephone number information.

Figure 13:
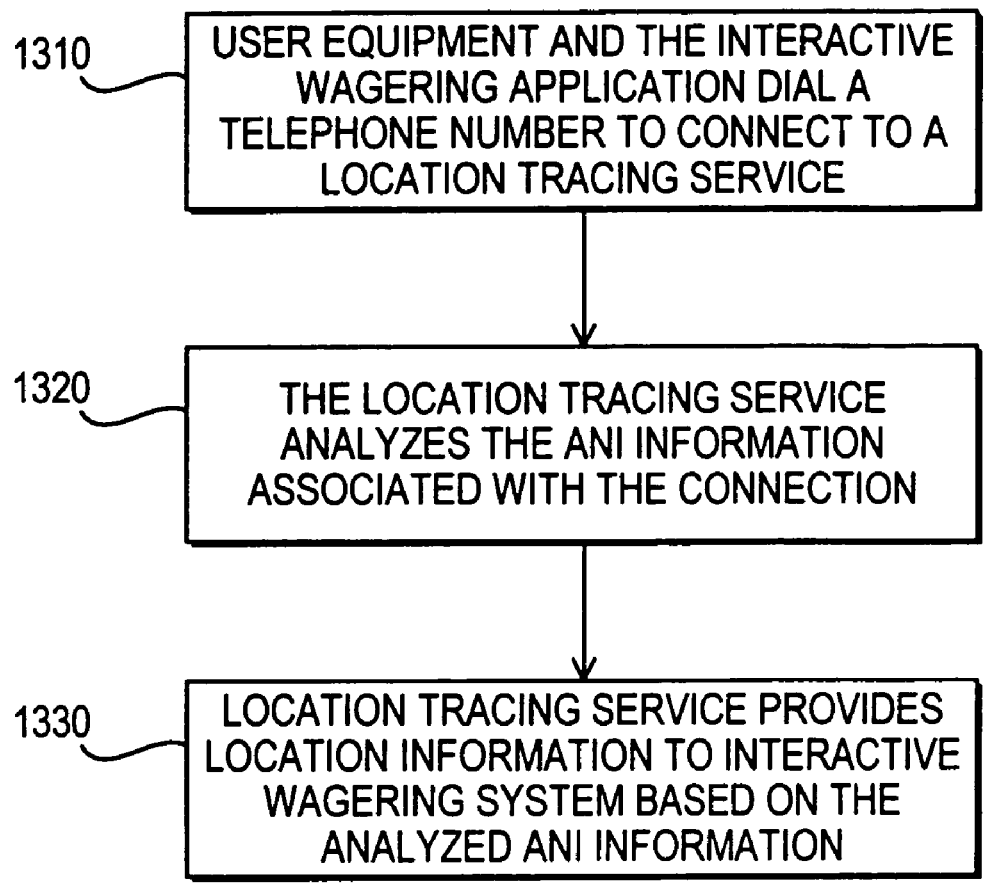
FIG. 13 is a flow chart of illustrative steps involved in allowing a location tracing service to determine the user equipment location by analyzing automatic number identification information in accordance with one embodiment of the present invention.

FIG. 13 is a flow chart of illustrative steps involved in allowing the location tracing service to determine user location by analyzing ANI information. At step 1310, interactive wagering system 10 may direct the user equipment and the interactive wagering application to dial a telephone number to connect to a location tracing service. At step 1320, the location tracing service may analyze ANI information associated with the connection between the user equipment and the location tracing service. After the ANI information is analyzed, the location tracing service may provide location information to interactive wagering system 10, as shown in step 1330.

The steps shown in FIG. 13 are merely illustrative. Additional steps may be added and one or more of the steps may be omitted or modified. For example, the steps may be modified to show how interactive wagering system 10 may obtain location information from an ISP as described below.

In another suitable approach, interactive wagering system 10 may gather location information from an ISP. For example, in a cable modem arrangement, the ISP may be aware of the user equipment location based on, for example, a record of the Internet protocol (IP) address associated with each cable modem. The ISP may also maintain a record of the physical location of each cable modem (as identified by its IP address). In a direct serial link (DSL) modem arrangement, a DSL provider at a local switching office may maintain a record of the physical location at which each user equipment DSL line terminates. ISP's that are accessed through a public switched telephone network may determine the user equipment location using ANI or using any other suitable technique.

In another suitable approach, the interactive wagering application may direct a GPS receiver to provide coordinate information to interactive wagering system 10. The GPS receiver may provide accurate location information (e.g., within a three hundred yard radius of the user) in standard latitude and longitude coordinates (e.g., degrees, minutes, and seconds) to interactive wagering system 10.

Interactive wagering system 10 may compare the location information (e.g., ANI information) with information in a central database to determine whether the user is located at a location where wagering is prohibited. The database may be used to maintain, for example, an updated listing of locations where wagering is prohibited. The database may be updated periodically, via polling, on-demand, or via any other suitable scheme.

If interactive wagering system 10 determines that the user is located at a location where wagering is prohibited, wagering access may be restricted. If interactive wagering system 10 determines that the user is located at a location where wagering is allowed, interactive wagering system 10 may direct the interactive wagering application to store a location verification token on the user equipment. A location verification token may be, for example, a signature, a key, or any other suitable element that provides the interactive wagering application with verification that the user is located in an area where wagering is legal. The interactive wagering application may use any suitable approach to obtain a location verification token. For example, the location verification token may obtained via dial-up, via the Internet, or via any other suitable approach. In one suitable approach, the location verification token may be provided by the interactive wagering application if the user equipment is located where wagering is permitted.

In one suitable approach, the location verification token may be encrypted, hidden, or both to prevent the user (or anyone else) from tampering with it. The location verification token may expire after a predetermined period of time (e.g., one day), at a predetermined time (e.g., midnight), at a randomly-selected time, or at any other suitable time.

When the location verification token has been stored at the user equipment, the interactive wagering application may provide the user with an indicator that the location verification token has been stored or that the user is otherwise ready to place wagers. This indicator may be any suitable indicator, such as a pop-up overlay message, or any other suitable indicator.

Interactive wagering system 10 may obtain location information at any suitable time. For example, interactive wagering system 10 may obtain location information in response to a user-initiated action or interactive wagering system 10 may automatically obtain location information. Interactive wagering system 10 may automatically obtain location information periodically (e.g., daily, weekly, etc.). In this manner, the user may be provided with substantially instant wagering access because interactive wagering system 10 has already determined the location of the user equipment prior to the user creating a wager. In another suitable approach, when the user initiates the wager creation process, interactive wagering system 10 may obtain the location information to determine whether the user equipment location permits wagering.

Figure 14:
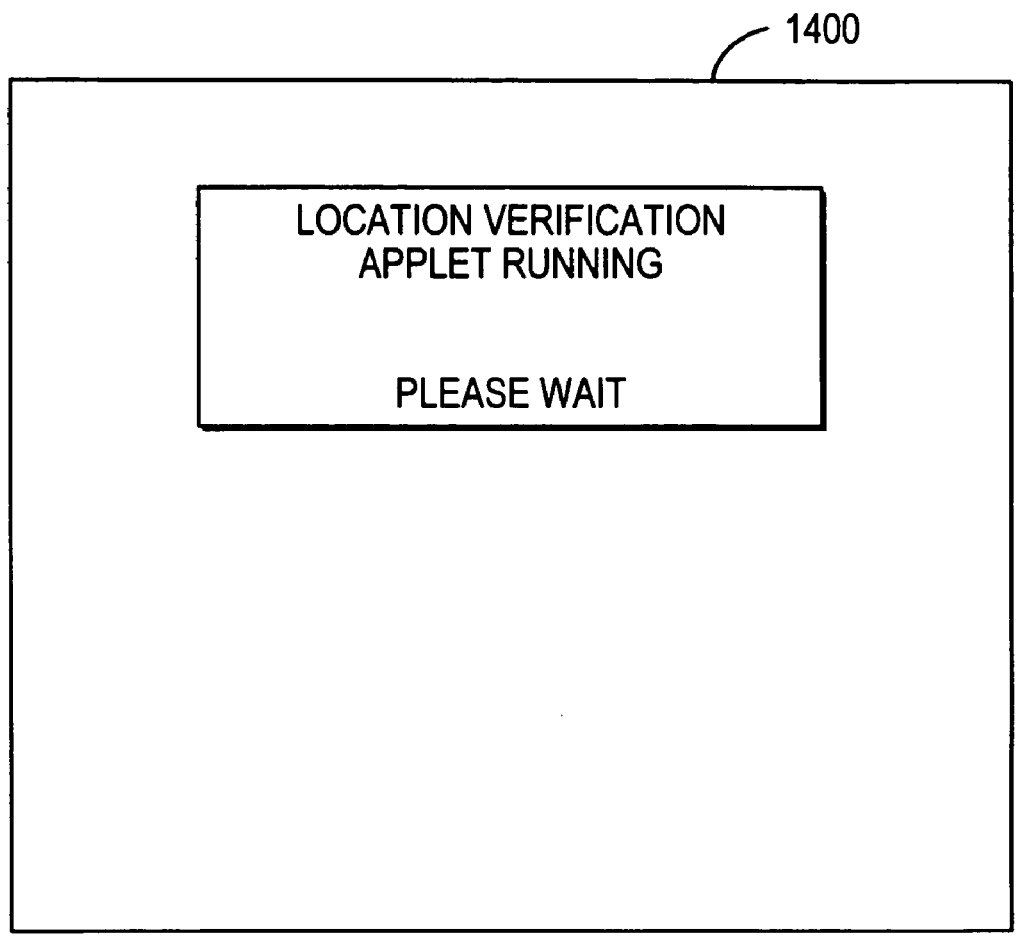
FIG. 14 shows an illustrative interactive wagering application screen for indicating that interactive wagering system is obtaining location information in accordance with one embodiment of the present invention.

FIG. 14 shows illustrative display screen 1400 that may be displayed by the interactive wagering application while interactive wagering system 10 obtains location information. This is merely illustrative. In another suitable approach, interactive wagering system 10 may run as a background process. Any such suitable approach may be used.

Figure 15:
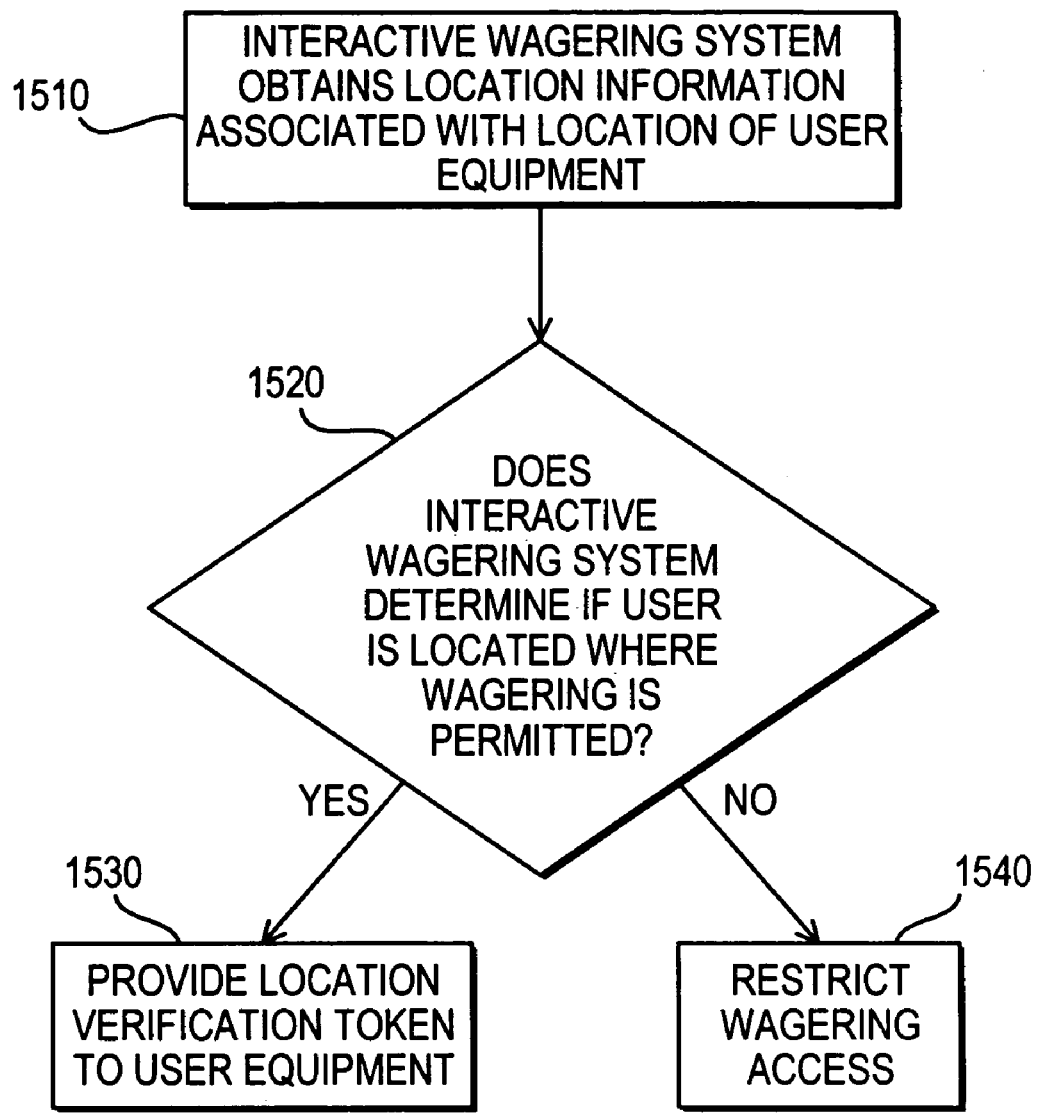
FIG. 15 is a flow chart of illustrative steps involved in determining the location of user equipment in accordance with one embodiment of the present invention.

FIG. 15 is a flow chart of illustrative steps involved in determining the location of the user equipment and providing a location verification token to the user equipment if the user equipment is located in a location where wagering is allowed. At step 1510, interactive wagering system 10 may obtain location information associated with the location of the user. The location information may be obtained, for example, by ANI information. Once the location information is obtained, it may be provided to interactive wagering system 10 for determining if the user is in a location that permits wagering.

At step 1520, interactive wagering system 10 may determine if the user is in a location where wagering is permitted. Interactive wagering system 10 may compare the location information with information in, for example, a centralized database to determine whether wagering is permitted at the location of the user equipment.

If wagering is permitted, interactive wagering system 10 may provide a location verification token to the interactive wagering application, as shown in step 1530. The location verification token may be stored in the user equipment and be used as a key for accessing wagering features of interactive wagering system 10 and of the interactive wagering application.

If the wagering is not permitted in the user equipment location, interactive wagering system 10 may restrict wagering access, as shown in step 1540.

The steps shown in FIG. 15 are merely illustrative. Additional steps may be added and one or more of the steps may be omitted or modified.

If the user attempts to place a wager, the interactive wagering application may check the user equipment to determine if it has a valid location verification token before permitting the user to access wagering features. In one suitable approach, the interactive wagering application may check the user equipment for a valid location verification token during a log-in process. The log-in process may provide the user with access to interactive wagering system 10. During log-in, the user may provide a name and password, and the interactive wagering application may provide indication that a valid location verification token is stored in the user equipment. Once the log-in process is complete, the user may access wagering features and place wagers.

Figure 16:
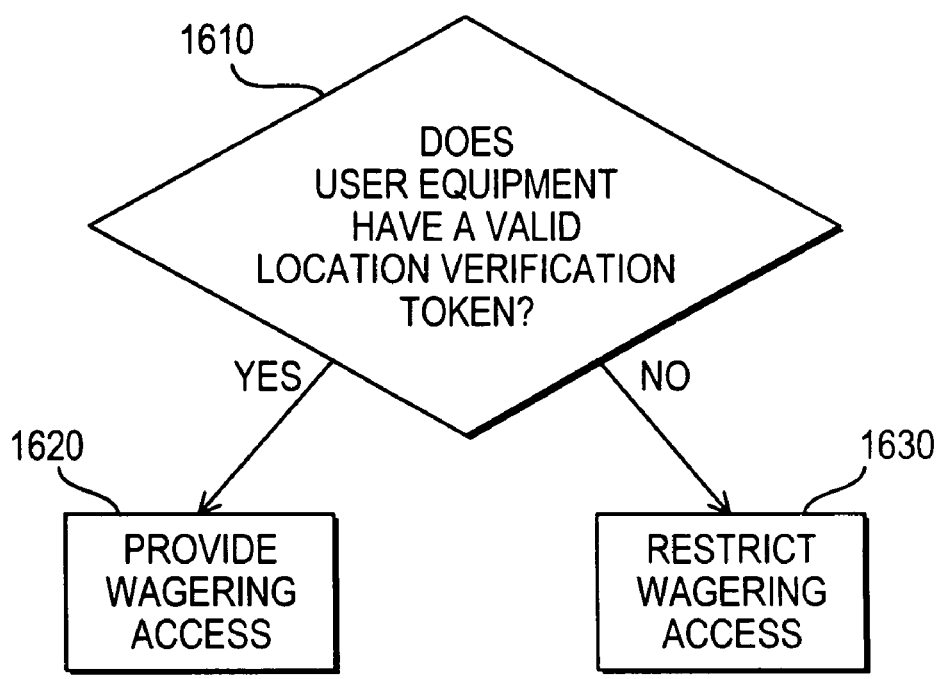
FIG. 16 is a flow chart of illustrative steps involved in using a token-based scheme in restricting wagering access in accordance with one embodiment of the present invention.

FIG. 16 is a flowchart of illustrative steps involved in providing wagering access based on a location verification token. At step 1610, the interactive wagering application may determine if the user equipment has a valid location verification token. This step may serve to verify that the user is in a location where wagering is legal. If a valid location verification token is detected by the interactive wagering application, the user may be provided with wagering access at step 1620. The user may, for example, create wagers, view racing statistics, view odds, view results, or access any other wagering-related features.

If a valid location verification token is not present on the user equipment, the interactive wagering application may restrict wagering access at step 1630. The interactive wagering application may also inform the user that wagering is restricted.

The steps shown in FIG. 16 are merely illustrative. Additional steps may be added and one or more of the steps may be omitted or modified.

If the interactive wagering application determines that the user is not permitted to access wagering features, the interactive wagering application may use any suitable display screen to indicate to the user that wager access is restricted. In one suitable embodiment of the interactive wagering application of the present invention, the interactive wagering application may indicate to the user the lack of wagering access. For example, an option in menu region 646 such as create wager option 652 may be displayed in a way that indicates the option is inactive. For example, to indicate that create wager option 652 is inactive, the interactive wagering application may display create wager option 652 as darkened, as shaded, as translucent, or as any other suitable appearance that may indicate the lack of wager access.

Figure 17:
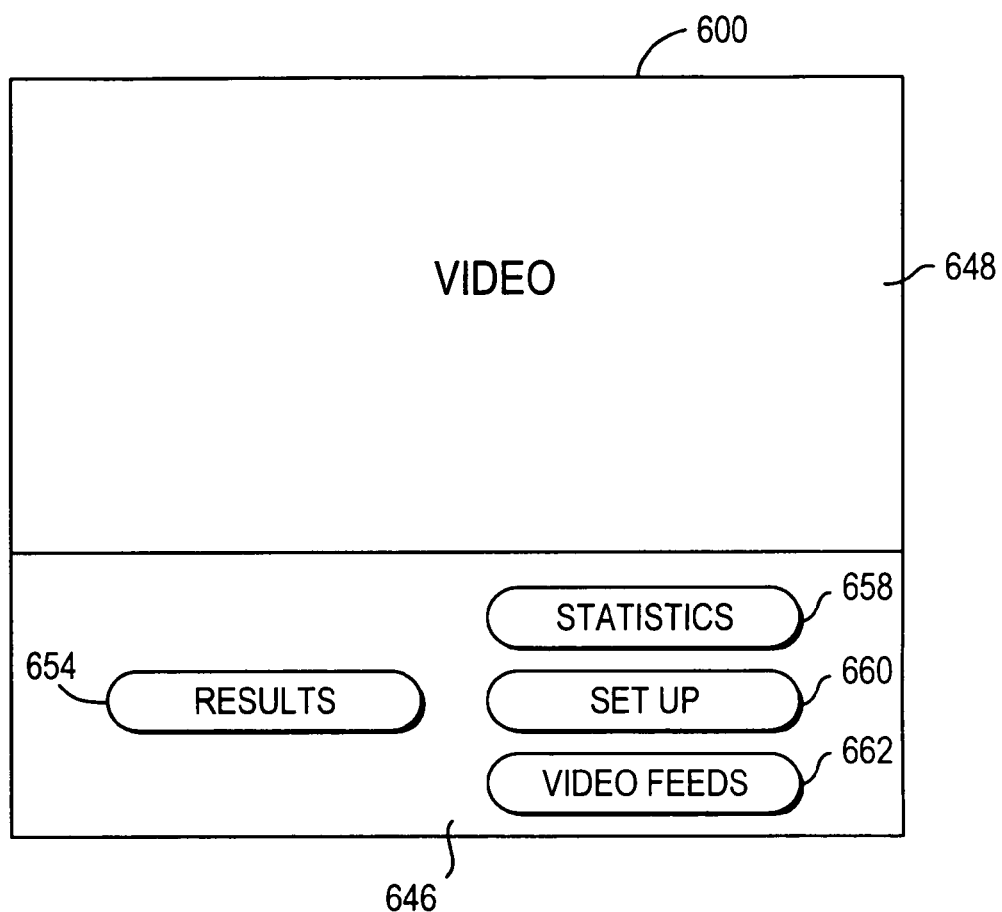
FIG. 17 shows another illustrative interactive wagering application screen that may indicate to the user that wagering access has been restricted in accordance with one embodiment of the present invention.

In another suitable approach the interactive wagering application may not display wager-related options to indicate the lack of wager access. For example, in FIG. 17, the interactive wagering application does not display create wager option 652 in display screen 600. The user may still be given the ability to access other options in menu region 646, such as results option 654, statistics option 658, setup 660, and video feeds 662. In another suitable approach, none or only some of these other options may be made available to the user by the interactive wagering application. Display screen 600 is merely illustrative. Any suitable arrangement of wagering related options may be used.

Figure 18:
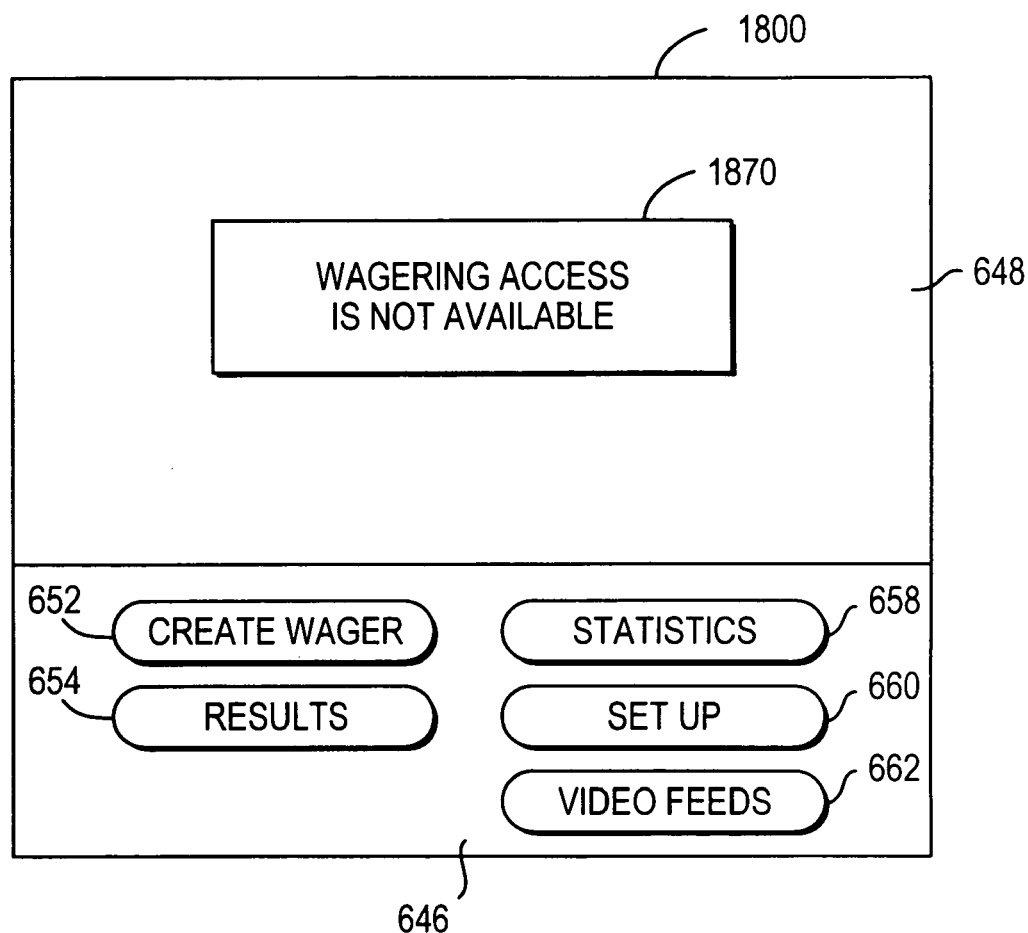
FIG. 18 shows another illustrative interactive wagering application screen that may indicate to the user that wagering access has been restricted in accordance with one embodiment of the present invention.

In another suitable approach, messages (e.g., in the form of overlays) may be displayed by the interactive wagering application to indicate to the user that wagering access is restricted. For example, if the user selects create wager option 652, the interactive wagering application may display overlay 1870 on display screen 1800, as shown in FIG. 18. Overlay 1870 may indicate to the user that access to the wagering interface is not available. Overlay 1870 may be any suitable overlay such as a text based overlay, video overlay, graphic overlay, cartoon overlay, symbol overlay, or any other suitable overlay. Display screen 1800 is merely illustrative. Any suitable display screen arrangement may be used.

In another suitable approach, the interactive wagering application may restrict wagering access by suppressing the display of icons that may indicate to the user that a wagering opportunity is available. For example, when a user is viewing a race-related event on a television display, the interactive wagering application may provide an icon or any other suitable indicator to indicate to the user that wagers for the race-related event may be placed. If wager access is restricted for any suitable reason (e.g., because of location, password protection, etc.), the indicators may not be displayed. In another suitable approach, if the indicators are selectable under unrestricted circumstances, then the indicators may be made passive when wager access is restricted.

Thus, systems and methods for restricting wagering access are provided. One skilled in the art will realize that the present invention can be practiced by other than the described embodiments, which are presented for purposes of illustration and not of limitation, and that the present invention is limited only by the claims which follow.

What is claimed is:

1. A method for restricting wagering access on user equipment, using an interactive wagering application comprising:
   determining a geographic location of the user equipment;
   checking whether wagering is allowed in the geographic location of the user equipment;
   providing the user equipment with a location verification token in response to a determination that the user equipment is in a location where wagering is allowed, wherein the location verification token comprises content that indicates that the user equipment is in a location where wagering is allowed;
   using the interactive wagering application to verify whether the location verification token is valid; and
   restricting wagering access when the user equipment does not have a valid location verification token.

2. The method of claim 1, further comprising providing wagering access when the user equipment has the location verification token.

3. The method of claim 1, wherein determining the geographic location of the user equipment comprises using a global positioning satellite system.

4. The method of claim 1, wherein determining the geographic location of the user equipment comprises using automatic number identification on a telephone network.

5. The method of claim 1, wherein checking whether wagering is allowed comprises:
   determining in which geographic locations wagering is not allowed; and
   comparing the geographic location of the user equipment with the geographic locations in which wagering is not allowed.

6. The method of claim 1, wherein checking whether wagering is allowed comprises:
   using an interactive wagering system and a location tracing service to analyze automatic number identification information obtained from having the user equipment establish a communications link using a telephone network.

7. The method of claim 6, wherein using an interactive wagering system comprises using a component selected from a group consisting of a transaction processing and subscription management system, totalisators, a subscription verification facility, and any combination thereof.

8. The method of claim 1 wherein the location verification token expires after a predetermined period of time.

9. The method of claim 1, further comprising:
   providing a user with the ability to set user-defined wagering access restrictions; and restricting wagering access based on the user-defined wagering access restrictions.

10. The method of claim 1, wherein restricting wagering access comprises performing a function selected from a group consisting of changing the appearance of wagering options in an interface, removing wagering options from an interface, displaying a message when a wagering option is selected from an interface, suppressing wager-related indicators from appearing on a display, suppressing a wagering event broadcast from being displayed, or any combination thereof.

11. The method of claim 1, wherein checking whether wagering is allowed comprises:
receiving blackout information at the user equipment; and
determining whether wagering is allowed based on the geographic location of the user equipment and on the blackout information.

12. The method of claim 1, further comprising automatically removing the location verification token from the user equipment after a predetermined period of time.

13. A method for enabling user equipment to verify whether it is located in a geographic location where wagering is allowed, using an interactive wagering application comprising:
using an integrated receiver decoder to receive blackout information, wherein blackout information indicates geographic regions that prohibit wagering;
obtaining location information that indicates the geographic location the user equipment is located; and
comparing the blackout information and the location information at the user equipment to determine whether the user equipment is located in a geographic location where wagering is allowed.

14. The method of claim 13 wherein the location information is obtained by a location tracing service that analyzes automatic number identification information obtained from having the user equipment establish a communications link using a telephone network.

15. The method of claim 13, further comprising restricting wagering access when the user equipment is determined to be in a location where wagering is not allowed.

16. The method of claim 13, wherein the location information is obtained from a global positioning satellite receiver.

17. A method for verifying that user equipment is located in a geographic location where wagering is allowed, using an interactive wagering application comprising:
determining in which geographic location the user equipment is located;
providing the user equipment with a location verification token in response to a determination that the user equipment is in a location where wagering is allowed, wherein the location verification token is provided by an interactive wagering system, wherein the location verification token comprises content that indicates that the user equipment is in a location where wagering is allowed, and wherein the location verification token is stored on the user equipment; and
restricting wagering access when the location verification token is not stored on the user equipment.

18. The method of claim 17 wherein determining in which geographic location the user equipment is located comprises using the interactive wagering system and a location tracing service to analyze automatic number identification information obtained from having the user equipment establish a communications link using a telephone network.

19. An interactive wagering system having user equipment that restricts wagering access, the interactive wagering system configured to:
determine a geographic location of the user equipment;
check whether wagering is allowed in the geographic location of the user equipment;
provide the user equipment with a location verification token in response to a determination that the user equipment is in a location where wagering is allowed, wherein the location verification token comprises content that indicates that the user equipment is in a location where wagering is allowed;
use an interactive wagering application to verify whether the location verification token is valid; and
restrict wagering access when the user equipment does not have a valid location verification token.

20. The system of claim 19 further comprising user equipment configured to provide wagering access when the user equipment has the location verification token.

21. The system of claim 19 further comprising a global positioning satellite system to determine the location of the user equipment.

22. The system of claim 19 further comprising a telephone network having automatic number identification functionality that is used to determine the geographic location of the user equipment.

23. The system of claim 19, wherein the interactive wagering system is further configured to:
determine in which geographic locations wagering is not allowed; and
compare the geographic location of the user equipment with the geographic locations in which wagering is not allowed.

24. The system of claim 19 is further configured to:
use the interactive wagering system and a location tracing service to analyze automatic number identification information obtained from having the user equipment establish a communications link using a telephone network.

25. The system of claim 24 wherein the interactive wagering system is comprised of a component selected from a group consisting of a transaction processing and subscription management system, totalisators, a subscription verification facility, user equipment, and any combination thereof.

26. The system of claim 19 wherein the location verification token expires after a predetermined period of time.

27. The system of claim 19, wherein the user equipment is configured to:
provide a user with the ability to set user-defined wagering access restrictions; and
restrict wagering access based on the user-defined wagering access restrictions.

28. The system of claim 19, wherein the user equipment is configured to perform a function selected from a group consisting of changing the appearance of wagering options in an interface, removing wagering options from an interface, displaying a message when a wagering option is selected from an interface, suppressing wager-related indicators from appearing on a display, suppressing a wagering event broadcast from being displayed, or any combination thereof.

29. The system of claim 19, wherein the user equipment is configured to:
receive blackout information; and
determine whether wagering is allowed based on the geographic location of the user equipment and on the blackout information.

30. The system of claim 19 wherein the user equipment is configured to determine the geographic location of the user equipment.

31. The system of claim 19 wherein the user equipment is configured to check whether wagering is allowed in the geographic location of the user equipment.

32. The system of claim 19, wherein the user equipment is configured to restrict wagering access when wagering is not allowed in the geographic location of the user equipment.

33. The system of claim 19, wherein the user equipment is configured to automatically remove the location verification token from the user equipment after a predetermined period of time.

34. An interactive wagering system that enables user equipment to verify whether it is located in a geographic location where wagering is allowed, the user equipment is configured to:
use an integrated receiver decoder to receive blackout information, wherein blackout information indicates geographic regions that prohibit wagering;
obtain location information that indicates the geographic location the user equipment is located; and
compare the blackout information and the location information at the user equipment to determine whether the user equipment is located in a geographic location where wagering is allowed.

35. The system of claim 34 further comprising a location tracing service to analyze automatic number identification information obtained from having the user equipment establish a communications link using a telephone network.

36. The system of claim 34, wherein the user equipment is configured to restrict wagering access when the user equipment is determined to be in a location where wagering is not allowed.

37. The system of claim 34, wherein the location information is obtained from a global positioning satellite receiver.

38. An interactive wagering system for verifying that user equipment is located in a geographic location where wagering is allowed, the system configured to:
determine in which geographic location the user equipment is located;
provide the user equipment with a location verification token in response to a determination that the user equipment is in a location where wagering is allowed, wherein the location verification token is provided by an interactive wagering system, wherein the location verification token comprises content that indicates that the user equipment is in a location where wagering is allowed, and wherein the location verification token is stored on the user equipment; and
restrict wagering access when the location verification token is not stored on the user equipment.

39. The system of claim 38 further comprising a location tracing service to analyze automatic number identification information obtained from having the user equipment establish a communications link using a telephone network.

40. A machine-readable medium encoded with machine-readable instructions for use in a system that restricts wagering access on user equipment, the machine-readable instructions configured to:
determine a geographic location of the user equipment;
check whether wagering is allowed in the geographic location of the user equipment;
provide the user equipment with a location verification token in response to a determination that the user equipment is in a location where wagering is allowed, wherein the location verification token comprises content that indicates that the user equipment is in a location where wagering is allowed;
use the interactive wagering application to verify whether the location verification token is valid; and
restrict wagering access when the user equipment does not have a valid location verification token.

41. The machine-readable medium of claim 40, the machine-readable instructions further configured to provide wagering access when the user equipment has the location verification token.

42. The machine-readable medium of claim 40, the machine-readable instructions further configured to use a global positioning satellite system.

43. The machine-readable medium of claim 40, the machine-readable instructions further configured to use automatic number identification on a telephone network.

44. The machine-readable medium of claim 40, the machine-readable instructions further configured to:
determine in which geographic locations wagering is not allowed; and
compare the geographic location of the user equipment with the geographic locations in which wagering is not allowed.

45. The machine-readable medium of claim 40, the machine-readable instructions further configured to use an interactive wagering system and a location tracing service to analyze automatic number identification information obtained from having the user equipment establish a communications link using a telephone network.

46. The machine-readable medium of claim 40, the machine-readable instructions further configured to store the location verification token at the user equipment for a predetermined period of time.

47. The machine-readable medium of claim 40, the machine-readable instructions further configured to:
provide a user with the ability to set user-defined wagering access restrictions; and
restrict wagering access based on the user-defined wagering access restrictions.

48. The machine-readable medium of claim 40, the machine-readable instructions for configured to perform a function selected from a group consisting of changing the appearance of wagering options in an interface, removing wagering options from an interface, displaying a message when a wagering option is selected from an interface, suppressing wager-related indicators from appearing on a display, suppressing a wagering event broadcast from being displayed, or any combination thereof.

49. The machine-readable medium of claim 40, the machine-readable instructions further configured to:
receive blackout information at the user equipment; and
determine whether wagering is allowed based on the geographic location of the user equipment and on the blackout information.

50. The machine-readable medium of claim 40, wherein the location verification token expires after a predetermined period of time.

51. The machine-readable medium of claim 40, the machine-readable instructions further configured to use the user equipment to determine the geographic location of the user equipment.

52. The machine-readable medium of claim 40, the machine-readable instructions further configured to use the user equipment to check whether wagering is allowed in the geographic location of the user equipment.

53. The machine-readable medium of claim 40, the machine-readable instructions further configured to use the user equipment to restrict wagering access when wagering is not allowed in the geographic location of the user equipment.

54. A machine-readable medium encoded with machine-readable instructions for enabling user equipment to verify whether it is located in a geographic location where wagering is allowed, the machine-readable instructions configured to:
use an integrated receiver decoder to receive blackout information, wherein blackout information indicates geographic regions that prohibit wagering;
obtain location information that indicates the geographic location the user equipment is located; and
compare the blackout information and the location information at the user equipment to determine whether the user equipment is located in a geographic location where wagering is allowed.

55. The machine-readable medium of claim 54, wherein the location information is obtained by a location tracing service that analyzes automatic number identification information obtained from having the user equipment establish a communications link using a telephone network.

56. The machine-readable medium of claim 54, the machine-readable instructions further configured to restrict wagering access when the user equipment is determined to be in a location where wagering is not allowed.

57. The machine-readable medium of claim 54, wherein the location information is obtained from a global positioning satellite receiver.

58. An interactive wagering system having user equipment that restricts wagering access, the system comprising:
means for determining a geographic location of the user equipment;
means for checking whether wagering is allowed in the geographic location of the user equipment;
means for providing the user equipment with a location verification token in response to a determination that the user equipment is in a location where wagering is allowed, wherein the location verification token comprises content that indicates that the user equipment is in a location where wagering is allowed;
means for using the interactive wagering application to verify whether the location verification token is valid; and
means for restricting wagering access when the user equipment does not have a valid location verification token.

59. The system of claim 58, further comprising means for providing wagering access when the user equipment has the location verification token.

60. The system of claim 58, wherein the means for determining the geographic location comprises means for using a global positioning satellite system.

61. The system of claim 58, wherein the means for determining the geographic location comprises means for using automatic number identification on a telephone network.

62. The system of claim 58, wherein the means for checking whether wagering is allowed comprises:
means for determining in which geographic locations wagering is not allowed; and
means for comparing the geographic location of the user equipment with the geographic locations in which wagering is not allowed.

63. The system of claim 58, wherein the means for checking whether wagering is allowed comprises means for using an interactive wagering system and a location tracing service to analyze automatic number identification information obtained from having the user equipment establish a communications link using a telephone network.

64. The system of claim 58, wherein the location verification token expires after a predetermined period of time.

65. The system of claim 58, further comprising:
means for providing a user with the ability to set user-defined wagering access restrictions; and
means for restricting wagering access based on the user-defined wagering access restrictions.

66. The system of claim 58, wherein the means for restricting wagering access comprises means for performing a function selected from a group consisting of changing the appearance of wagering options in an interface, removing wagering options from an interface, displaying a message when a wagering option is selected from an interface, suppressing wager-related indicators from appearing on a display, suppressing a wagering event broadcast from being displayed, or any combination thereof.

67. The system of claim 58, wherein the means for checking whether wagering is allowed comprises:
means for receiving blackout information at the user equipment; and
means for determining whether wagering is allowed based on the geographic location of the user equipment and on the blackout information.

68. The system of claim 58, further comprising means for automatically removing the location verification token from the user equipment after a predetermined period of time.

69. The system of claim 58, further comprising means for using the user equipment to determine the geographic location of the user equipment.

70. The system of claim 58, further comprising means for using the user equipment to check whether wagering is allowed in the geographic location of the user equipment.

71. The system of claim 58, further comprising means for using the user equipment to restrict wagering access when wagering is not allowed in the geographic location of the user equipment.

72. An interactive wagering system for enabling user equipment to verify whether it is located in a geographic location where wagering is allowed, the system comprising:
means for using an integrated receiver decoder to receive blackout information, wherein blackout information indicates geographic regions that prohibit wagering;
means for obtaining location information that indicates the geographic location the user equipment is located; and
means for comparing the blackout information and the location information at the user equipment to determine whether the user equipment is located in a geographic location where wagering is allowed.

73. The system of claim 72, wherein the location information is obtained by a location tracing service that analyzes automatic number identification information obtained from having the user equipment establish a communications link using a telephone network.

74. The system of claim 72, further comprising means for restricting wagering access when the user equipment is determined to be in a location where wagering is not allowed.

75. The system of claim 72, wherein the location information is obtained from a global positioning satellite receiver.

76. An machine-readable medium encoded with machine-readable instructions for use in an interactive wagering system for verifying that user equipment is located in a geographic location where wagering is allowed, the machine-readable instructions configured to:
- determine in which geographic location the user equipment is located;
- provide the user equipment with a location verification token in response to a determination that the user equipment is in a location where wagering is allowed, wherein the location verification token is provided by an interactive wagering system, wherein the location verification token comprises content that indicates that the user equipment is in a location where wagering is allowed, and wherein the location verification token is stored on the user equipment; and
- restrict wagering access when the location verification token is not stored on the user equipment.

77. The machine-readable medium of claim 76, the machine-readable instructions further configured to use the interactive wagering system and a location tracing service to analyze automatic number identification information obtained from having the user equipment establish a communications link using a telephone network.

78. An interactive wagering system for verifying that user equipment is located in a geographic location where wagering is allowed, the system comprising:
- means for determining in which geographic location the user equipment is located;
- means for providing the user equipment with a location verification token in response to a determination that the user equipment is in a location where wagering is allowed, wherein the location verification token is provided by an interactive wagering system, wherein the location verification token comprises content that indicates that the user equipment is in a location where wagering is allowed, and wherein the location verification token is stored on the user equipment; and
- means for restricting wagering access when the location verification token is not stored on the user equipment.

79. The system of claim 78, wherein the means for determining comprises means for using the interactive wagering system and a location tracing service to analyze automatic number identification information obtained from having the user equipment establish a communications link using a telephone network.

* * * * *

UNITED STATES PATENT AND TRADEMARK OFFICE
CERTIFICATE OF CORRECTION

PATENT NO. : 7,229,354 B2  Page 1 of 1
APPLICATION NO. : 09/827679
DATED : June 12, 2007
INVENTOR(S) : Richard E. McNutt et al.

It is certified that error appears in the above-identified patent and that said Letters Patent is hereby corrected as shown below:

Column 11, line 40, delete "an" after "With"
Column 11, line 61, change "service be" to --service by--
Column 14, line 13, insert --as-- after "such"
Column 21, line 60, insert --be-- after "may"

Signed and Sealed this

Fourth Day of December, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,229,354 B2 | |
| APPLICATION NO. | : 09/827679 | |
| DATED | : June 12, 2007 | |
| INVENTOR(S) | : Richard E. McNutt et al. | |

It is certified that error appears in the above-identified patent and that said Letters Patent is hereby corrected as shown below:

Item (56), in 5,083,272, change class and subclass to --"364/412"--.
Item (56), in 6,001,016, change subclass to --"42"--.

Item (56), insert the following 12 missing U.S. patent references:
--5,830,068 11/03/98 Brenner et al. 463/42--
--5,564,977 10/15/96 Algie 463/25--
--5,415,416 05/16/95 Scagnelli et al. 273/439--
--5,408,417 04/18/95 Wilder 364/479--
--5,249,044 09/28/93 Von Kohorn 358/86--
--5,233,654 08/03/93 Harvey et al. 380/20--
--5,227,874 07/13/93 Von Kohorn 358/84--
--5,083,800 01/28/92 Lockton 273/439--
--5,083,271 01/21/92 Thacher et al. 364/411--
--4,799,683 01/24/89 Bruner, Jr. 273/138A--
--4,706,121 11/10/87 Young 358/142--
--4,704,725 11/03/87 Harvey et al. 380/9--

Item (56), insert the following 4 missing foreign patent references:
--GB 2 300 535 11/06/96 UK H04N 5/262--
--WO 95/01058 01/05/95 PCT H04N 7/16--
--0 624 039 A2 11/09/94 EPO H04N 7/173--
--0 620 688 A2 10/19/94 EPO H04N 7/14--

Item (56), insert the following 7 missing other document references:
--You Bet Help File, Youbet.com, Inc., Los Angeles, California, last modified Jul. 11, 1998, pp. 1-132.--
--Maury Wolff, "Interactive Wagering A Good Bet", Daily Racing Form, Jan. 29, 1995, p.4.--
--John Burgess, "And We're Off to the Races", Washington Post, Jan. 16, 1995, pp. 17-18.--
--Ross Peddicord, "New on TV: You Bet Your Horse", The Baltimore Sun, Dec. 15, 1994, pp. 1A and 16A.--
--Yee-Hsiang Chang et al., "An Open-Systems Approach to Video on Demand", IEEE Communications Magazine, May 1994, pp. 68-80.--

UNITED STATES PATENT AND TRADEMARK OFFICE
CERTIFICATE OF CORRECTION

PATENT NO. : 7,229,354 B2
APPLICATION NO. : 09/827679
DATED : June 12, 2007
INVENTOR(S) : Richard E. McNutt et al.

It is certified that error appears in the above-identified patent and that said Letters Patent is hereby corrected as shown below:

--Trackmaster User's Guide, Version 2.0.7, AXCIS Pocket Information Network, Inc., 4701 Patrick Henry Drive, Building 8, Santa Clara, CA 95054, Apr. 1994, unnumbered front and back covers and pp. 1-122.--
--<u>Auto Track II Systems Overview</u>, Autotote Systems, Inc., 100 Bellevue Road, Newark, DE 19714-6009, Sep. 1993, sixteen unnumbered introductory pages and pp. 1-21.--

Signed and Sealed this

Fifth Day of February, 2008

JON W. DUDAS
*Director of the United States Patent and Trademark Office*